United States Patent [19]
Chiopris et al.

[11] Patent Number: 5,712,960
[45] Date of Patent: Jan. 27, 1998

[54] SYSTEM AND METHODS FOR INTELLIGENT DATABASE MANAGEMENT USING ABDUCTIVE REASONING

[75] Inventors: Carlo Chiopris, Verona; Franco Losi, Piacenza, both of Italy

[73] Assignee: CV Soft, S.R.L., Bergamo, Italy

[21] Appl. No.: 641,013

[22] Filed: Apr. 15, 1996

Related U.S. Application Data

[63] Continuation of Ser. No. 86,969, Jul. 2, 1993, abandoned.

[51] Int. Cl.$^6$ ............................................. G06F 17/00
[52] U.S. Cl. ................... 395/77; 395/54; 395/66
[58] Field of Search ..................... 395/10–11, 13, 395/54, 50–51, 60–62, 77, 64

[56] References Cited

U.S. PATENT DOCUMENTS

| | | | |
|---|---|---|---|
| 5,018,075 | 5/1991 | Ryan et al. | 395/51 |
| 5,175,800 | 12/1992 | Galis et al. | 395/51 |
| 5,337,320 | 8/1994 | Kung | 395/909 |
| 5,355,474 | 10/1994 | Thuraisngham et al. | 395/600 |

OTHER PUBLICATIONS

Berztiss, "Operational construction of integrity constraints"; Proceedings. Fourth International conference on software engineering and knowledge engineering, pp. 487–494, 15–20 Jun. 1992.

Joseph et al, "A knowledge–based subsystem for a natural language interface to a database that predicts and explains query failures"; Proceedings. Seventh International conference on data engineering, p. 80–7, 8–12 Apr. 1991.

Huang et al, "An automatic assembly planning system"; Proceedings 1990 IEEE International conference on robotics and automation, pp. 1594–1599 vol. 3, 13–18 May 1990.

Su, "Extensions to the object–oriented paradigm"; Proceedings of the 13th annual international computer software and applications conference, pp. 197–199, 20–22 Sep. 1989.

Yu et al, "Automatic knowledge acquistion and maintenance for semantic query optimization"; IEEE Transactions on knowledge and data engineering, vol. 1 iss. 3 pp. 362–375, Sep. 1989.

Fraser et al, "Errors in abductive reasoning"; 1989 IEEE International Conference on Systems, man, and cybernetics, pp. 1136–1141 vol. 3, 14–17 Nov. 1989.

*Primary Examiner*—Tariq R. Hafiz
*Attorney, Agent, or Firm*—Townsend and Townsend and Crew LLP

[57] ABSTRACT

A system of the present invention includes a computer having a processor and a memory, which includes general-purpose components providing support for application tasks processing. In a preferred embodiment, the general-purpose components include a Database Management System (50), a Deductive Database (40), and an Abductive Metainterpreter (30); the latter including an engine for abducing new information from known facts stored in the database. In this fashion, a user may model an environment or domain of interest (e.g., a communication network). Once defined, the environment is automatically maintained by the system of the present invention. In response to a user request for modifying the environment, for example, the system automatically generates transactions which satisfy the request.

29 Claims, 32 Drawing Sheets

SYSTEM AND METHODS FOR INTELLIGENT DATABASE MANAGEMENT USING ABDUCTIVE REASONING

This is a continuation of application of Ser. No. 08/086,969 filed Jul. 2, 1993, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of data processing and, more particularly, to tools and methods for the design and implementation of intelligent database management systems.

Computers have become a powerful tool for the rapid and economic assimilation of information. Relational database management system (RDBMS), for example, are computer applications for storing and tracking vast amounts of information in tabular format. Using the inherent speed of digital processing, these electronic record-keeping systems provide a user with immediate access to selected information on demand. The construction and operation of RDBMS is known in the art. See e.g., Date, C., *An Introduction to Database Systems*, Vol. I & II, Addison Wesley, 1990; the disclosure of which is hereby incorporated by reference.

Despite many benefits, relational database management systems have distinct shortcomings. For instance, in existing RDBMSs one cannot define recursive views, update views, or define generic constraints. Instead, existing RDBMS tools only assist in verifying the underlying data model, such as checking its consistency with constraints defined in relational theory (e.g., such as entity or referential). Thus, the RDBMS developer must develop complex and expensive procedural applications in a host language (e.g., C or Cobol) which use SQL support to access and update data. Thus, any "intelligence" of the system must be added by the application developer.

System and methods are needed for intelligently processing known information, particularly that which is readily available from a DBMS. Such a system should be capable of deducing additional information from information which is known to be true (e.g., present in the DBMS) or which can be assumed to be true. Furthermore, the deduced information should be employed by the system for achieving user-specified goals, all accomplished without resorting to customized procedures (e.g., application programming). The present invention fulfills this and other needs.

SUMMARY OF THE INVENTION

A system of the present invention includes a computer having a set of general-purpose components providing support for application tasks processing. In a preferred embodiment, the general-purpose components include a Database Management System (DBMS), a Deductive Database (DDB), and an Abductive Metainterpreter (AM). A user interface (UI) is also provided, as desired.

Both the DBMS and UI may be conventional in nature. According to the present invention, however, DBMS is preferably a relational database management system (RDBMS), and UI is preferably a graphical user interface (GUI).

DDB, on the other hand, includes a normal or extensional database (EDB) having an intensional database (IDB) and integrity constraints (IC). EDB includes a set of ground facts defined on base (non-derived) relations, corresponding to tuples in a relational database (RDB) and describing some state of the world or environment. Since the ground facts are defined on base relationships, they are explicitly represented and therefore require no additional inference steps. The intensional rules or IDB 43, on the other hand, includes a set of logical rules defining view relations (which are derived) that allow one to derive facts from other facts. Through the rules of the IDB, new facts may be deduced from those explicitly contained in the EDB. Finally, IC include generic logical formulas that specify conditions, which can be of any desired nature, under which the database will be considered consistent.

AM provides a deductive engine for processing user-specified update requests on known objects, i.e., objects whose attributes and relationships (with other objects) are sufficiently described. Through abductive logic, the Abductive Metainterpreter can update (e.g., insert or delete) deducible information. In this manner, the AM provides a solution to the complex task of processing deduced information, which may itself have been deduced.

System development according to the present invention consists of the customization of these components for the specific environment or domain in which the system will operate. Using the system and tools of the present invention, one need only describe the environment in which the application will work (i.e., data model, views, and the like) and the constraints which must be respected in this environment. Applying abductive reasoning to the description provided by the developer in the definition phase, the system of the present invention derives all transactions required to achieve the user-specified goal (Request).

The present invention has distinct advantages. Since transactions which accomplish the user-specified requests are automatically generated at runtime, the application developer is freed from the development of complex application code. Since the transactions are automatically derived from the data model and associated constraints, subsequent changes may be made without modifying coded procedures (i.e., the application) that executes these definitions. Moreover, the system automatically maintains (i.e., without procedural coding) correct and consistent data.

BRIEF DESCRIPTION OF THE DRAWINGS

FIGS. 6A–L are bitmap screen shots illustrating operation of the Automatic Network Configurator of the present invention in a Macintosh environment.

FIGS. 8A–I are bitmap screen shots illustrating a toolkit extension to the Network Object Editor of FIG. 5, which allows for the creation of additional embodiments (i.e., ones having different domains).

TABLE OF CONTENTS

Figure 1A:
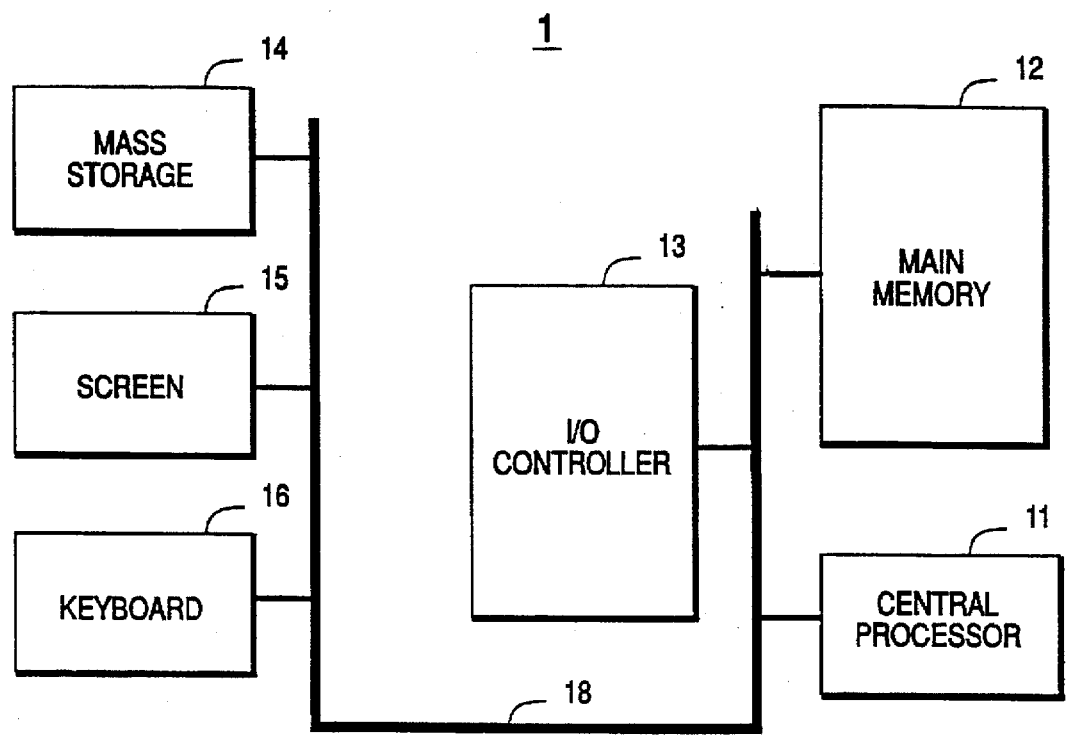
FIG. 1A is a block diagram of a computer system in which the present invention may be embodied.

I. Hardware Embodiment
II. Software System
   A. System Components
      1. Graphical User Interface and Database Management System
      2. Deductive Database
      3. Abductive Metainterpreter
   B. General Operation
III. Exemplary Embodiment: Automatic Network Configurator
   A. Introduction
   B. Basic Problem: Configuration
   C. Design Considerations
      1. Domain Model
      2. OSI Management Modelling Prescriptions
      3. Relationships
      4. OSI Management and Relational Model
      5. OSI Management and Logic Programming
      6. Domain Objects
      7. Domain Relationships
      8. Domain Constraints
   D. System Construction and Operation
   E. ANC Module
      1. User Interface
      2. Server
      3. Database Manager
      4. Abductive Agent
      5. Configuration Files Generator
      6. Network Configuration Model
      7. Network Object Editor
   F. General Operation
IV. Alternative Embodiment: Company Management

GLOSSARY 1. 1nf First Normal Form One of the fundamental constraints in the relational model. It prescribes that every attribute value of every row be atomic, that is not further decomposable.
2. 2nf Second Normal Form A relation is in 2nf if and only if it is in 1nf and each non-key attribute is fully dependent on the primary key (the set of attributes uniquely identifying a row).
3. 3nf Third Normal Form A relation is in 3nf if and only if it is in 2nf and each non-key attribute is nontransitively dependent on the primary key. The intuitive meaning is that each row of a relation is composed just of a primary key, that allows to identify a given entity, and of a set of mutually independent attributes that describe the entity.
4. AI Artificial Intelligence
5. ANC Automatic Network Configurator
6. API Application Program Interface
7. AVA Attribute-Value Assertion
8. Base Relation See EDB
9. CASE Computer Aided Software Engineering
10. CF Configuration File
11. CM Configuration Manager
12. CMIP Common Management Information Protocol
13. CMISE Common Management Information Service Element
14. Constraints Logic formulas specifying the conditions that must be met by a theory (or a Data Base) to be considered consistent.
15. DDB Deductive Data Base. See also RDBMS, Deduction, Abduction
16. DIB Directory Information Base
17. DN Distinguished Name
18. EDB Extensional Data Base A component of DDB. The set of ground facts defined on base relations (which are assumed to be primitive, not further deducible) describing the state of the world comprise EDB. Ground facts can be interpreted as tuples in a RDB. See also RDBMS, Deduction, Abduction.
19. ES Expert System
20. GDL Graphic Description Language Graphic language of MacProlog.
21. Generative grammar A set of grammatical rules defining a language as the set of phrases that can be produced by repeatedly applying rules.
22. Ground fact In Logic Languages such as Prolog ground facts are clauses not containing variables, which can declare something about an entity or a relationship. They can be interpreted as tuples in a RDB.
23. IDB Intensional Data Base The part of a DDB composed by the set of rules defining view relations (non-primitive ones). Rules determine that facts can be derived by other facts. See also RDBMS, Deduction, Abduction
24. KA Knowledge Acquisition
25. KBS Knowledge Based Systems
26. KE Knowledge Engineering
27. Knowledge Source A function describing a primitive inference mechanism. It takes meta-classes as input, and produces met-classes as output. Similar to a bubble in DFD.
28. MetaClass A role that concepts and domain structure can play in an inferential process.
29. MIB Management Information Base
30. MIS Management Information System
31. MO Managed Object
32. NC Network Configuration
33. NMF Network Management Forum
34. Normalizing To normalize a relation means to put it in some normal form. Normal form are important in Data Base design as they are correlated with redundancy: "normalized" and "non-redundant" are almost synonymous. When talking of a normalized relation, one mainly refers to 3rd normal form. See also 1nf, 2nf e 3nf.
35. OSIM OSI Management
36. Parser Language analyzer
37. RDB Relational Data Base See also RDBMS.
38. RDBMS Relational Data Base Management System See also RDBMS, Deduction, Abduction.
39. Requests User requests define updates on a Data Base. They can either be expressed in terms of base relations, or in terms of view relations. In the latter case this requires a mechanism (in our system an abductive mechanism) to map the request in terms of base relations. See also Abduction, Deduction.
40. Rule In Logic Programming languages, such as Prolog, rules are clauses defining an implication, that specifies that a consequence is true when its premises are true.

41. SE Software Engineering
42. SIX System Interfacing for X-Windows
43. SMP System Management Provider
44. SW Software
45. UI User Interface
46. View Relation See IDB.

DESCRIPTION OF THE SPECIFIC EMBODIMENTS

I. Hardware Embodiment

The invention may be embodied on a standalone (single-user) computer system such as the system 1 of FIG. 1, which comprises a central processor 11, a main memory 12, an input/output controller 13, a keyboard 16, a screen or display device 15, and a mass storage 14 (e.g., hard disk). Additional input/output devices, such as a printing device, may be included as desired. As shown, the various components of the system 1 communicate through a system bus 18 or similar architecture. Alternatively, the present invention may be embodied in a multi-user environment (as described in further detail hereinbelow).

In operation, system 1 receives commands or other input from a user through the keyboard 16 or other input device (e.g., mouse). In response, the computer system 1 will typically display data, such as textual or graphical images, on the display device or screen 15, which may be a cathode-ray tube, LCD display panel, or the like. Information which is to be retrieved at a future date, such as application programs or database tables, is stored in the mass storage 14. In a preferred embodiment, an appropriately programmed SPARC-compatible work station (available from a variety of vendors, including Sun Microsystems of Mountain View, Calif.) is used running under the UNIX operating system (also available from several vendors, including the Santa Cruz Operation of Santa Cruz, Calif.). Of course, other computing systems from other vendors may also be employed.

II. Software System

A. System Components

1. Graphical User Interface and Database Management System

Figure 1B:
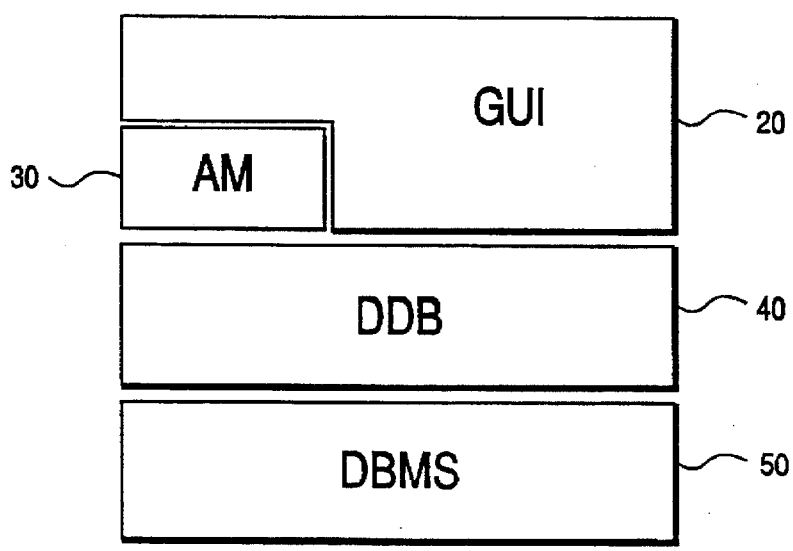
FIG. 1B is a block diagram of a software system of the present invention, for controlling the operation of the system of FIG. 1A.

As shown in FIG. 1B, a computer software system 2 is provided for programming or directing the operation of the computer system 1. Software system 2, which is stored in system memory 12 and on disk memory 14, includes a Graphical User Interface (GUI) 20, an Abductive Metainterpreter (AM) 30, a Deductive Database (DDB) 40, and a Relational Database Management System (RDBMS) 50. Additional components, such as CASE (computer-aided software engineering) tools, may be provided, as desired.

The components of system 2 will now be described. GUI 20 may be conventional in nature. GUI 20, for example, may be any one of a number of available graphical user interfaces (e.g., Macintosh OS, Microsoft Windows, NextStep, X-Windows, and the like) which provide a graphic shell for receiving and presenting information to the users.

Similarly, DBMS 50 may be a conventional relational database manager, such as available from Ingres, Oracle, and Sybase. A Data Base Management System (DBMS) is defined as "Relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes). These relations or "R-tables" can also be interpreted as files, subject to given constraints (e.g., first normal form).

A "relation" is something quite different from a "relationship" or an "association." Instead, relation has a precise mathematical meaning. In contrast, a relationship (entity-relationship) model or an association (object-association) model is used to indicate that two or more entities or concepts are in a given but generic association. Through the use of relations in a database, a relationship can be expressed in very different ways.

An important equivalence exists between a relational database (RDB) and a program (in the Logic Programming sense) composed only of ground facts (clauses without variables). This direct relationship is best illustrated by an example. For instance, a program composed of the clauses {father(john,paul), father(paul,jane)} has an obvious logical meaning; it is equivalent to a table of two rows and two columns in a RDB having the same information. This equivalence simplifies the interface of a RDB to a Logic Program and, thus, simplifies implementation of the present invention.

2. Deductive Database

In describing DDB 40, it is first helpful to review basic principles and techniques of deduction. Deduction is a logical process that allows one to derive the truth of given propositions. In particular, the truth is derived from the truth of other propositions, which are either assumed to be true or are postulated as such. Typically, the process is accomplished through a sequence of basic steps, which collectively amount to a demonstration, A simple example illustrates this concept. From the facts:

male(mark) female(jane) parent(george,mark) parent(george,jane)

and from the rules:

brother(X,Y) if parent(Z,X) and parent(Z,Y) and male(X)

one can deduce:

brother(mark,jane).

Deduction is perhaps the most widely used logic process in computers, with most types of computation and view processing in relational databases interpreted as deduction. In RDBMSs, for example, queries and views are usually expressed not in terms of Relational Algebra but in terms of Relational Calculus. Since computations are a form of deduction, Logics or Logic Programming may be employed as a computer language. The SQL language—the most popular data access language for RDBMS—is itself a subset of Logics; even a SQL engine can be considered as an inference engine.

DDB 40 itself is a logical paradigm—all concepts of relational theory are mapped into logical representations. A definition of a relationship, for example, corresponds to the definition of a first order logical predicate, where the name of the relationship is its functor and the columns of the relationship are its parameters. Hence, a tuple (row) in the relationship corresponds to an instance of the related predicate with the same parameter values. Furthermore, most relational operators are mapped into predicates that perform the same tasks. In this manner, most SQL statements, regardless of complexity, can be simulated using logical predicates only. (Some SQL constructs are procedural or can be expressed only in other ways.)

Figure 1C:
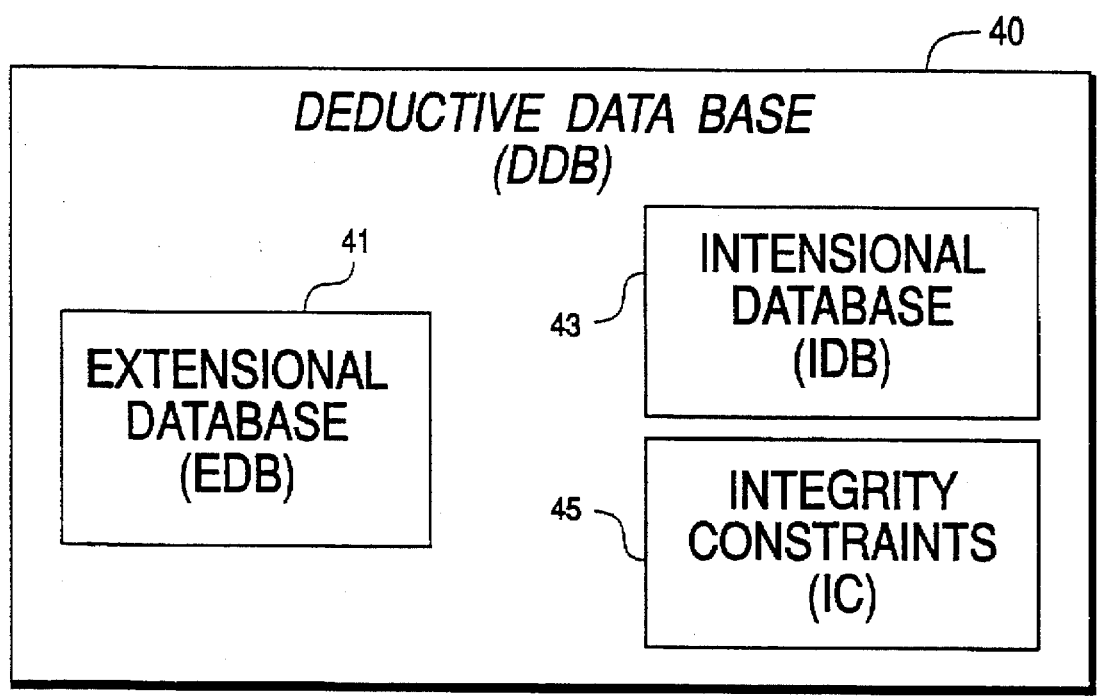
FIG. 1C is a block diagram illustrating the deductive database (DDB) of FIG. 1B.

Shown in further detail in FIG. 1C, DDB 40 comprises a normal or extensional database (EDB) 41, having intensional database (IDB) 43 and integrity constraints (IC) 45. EDB 41 is a set of ground facts defined on base (non-derived) relations, corresponding to tuples in a relational database (RDB), and describing some state of the world or environment. Since the ground facts are defined on base relationships, they are not deducible.

The intensional rules or IDB 43, on the other hand, includes a set of rules (Horn clauses) defined on derived relationships (i.e., ones which are deducible). Thus, IDB includes a set of logical rules defining view relations (which are derived) that allow one to derive facts from other facts. While these rules are quite similar to view definition in a RDB, they are usually more powerful as they allow recursion. Through the rules of the IDB 43, new facts may be deduced from those explicitly contained in the EDB 41.

IC 45, the third component of the DDB 40, are generic logical formulas that specify conditions, which can be of any desired nature, under which the database is considered consistent. Since integrity is verified by the system, procedural applications need not be developed for performing this task. Thus, if the user attempts to update data, the system automatically verifies whether this would violate the constraints; update requests are only performed on the condition that no constraint is violated.

In operation, Deductive Database (DDB) 40 communicates with the user through the services of the GUI 20 and stores basic data in the DBMS 50. DDB 40 uses standard services provided by the DBMS 50 to build the desired data model and to maintain the EDB. Since it conforms to the constraints of the relational model, the EDB itself can be stored in a relational database. In fact, the EDB is a collection of relations (tables), where each contains a number of tuples (rows). These rows in the EDB 40 are "ground facts." Intentional rules, on the other hand, are defined for deriving deducible information from the EDB. The definitions themselves are stored in the IDB.

Deductive databases differ significantly from relational databases, however. In deductive databases, for example, the logical interpretation is stressed. Moreover, the expressive power of deductive databases is much higher as recursion is allowed in rules and in constraints. For example, the IDB allows for the definition of recursive views, a feature not supported by standard SQL. Since these and other definitions are not supported by the RDBMS's data access language (SQL), the IDB is preferably not implemented by a RDBMS. Instead, the IDB of the present invention is preferably implemented as an extension of the RDBMS. Employing the features of the IDB, a user who wishes recursive views need only define them using the rule syntax provided by the IDB. Since the IDB can derive all possible deducible data, this approach has the added advantage of achieving minimum redundancy.

Employing the previous example, the structure and operation of the DDB can now be readily understood. EDB is composed of the two relations male and parent, IDB is composed of the brother rule, and IC might be composed of the formula not (male(X) and female(X)), i.e., one cannot be male and female at the same time. Employing only the DDB 40, basic information may be inserted or deleted, derived/deduced information may be read, and database consistency (with respect to integrity constraints) may be maintained.

By itself, however, the DDB preferably does not include a mechanism for inserting and deleting derived information. For instance, if it has been defined that a condition A is deducible from conditions B and C, the DDB by itself should not insert or delete the condition A. Moreover, the insertion or deletion of derived data may quickly become a very complex task; as set forth above, for example, B and C can themselves be derived information as well. The process may continue recursively to a very complex level. Thus, in both relational databases and deductive databases, only base relations, not derived relations, can be updated. To update view relations one must resort to a different reasoning mechanism, which will now be explained.

3. Abductive Metainterpreter

Abductive Metainterpreter (AM) 30 provides a solution to this complex task of processing deduced information, which may itself have been deduced. Specifically, it provides an inference engine for processing user-specified update requests on known objects, i.e., objects whose attributes and relationships (with other objects) are sufficiently described. The engine itself employs abductive logic methodology. In contrast to the DDB, the Abductive Metainterpreter 30 can update (i.e., insert or delete) deducible information.

A general introduction to abductive logic will aid in the understanding of AM 30. Although it is often confused with deduction, abduction is a different logic process. Specifically, it allows one to justify given observables by hypothesizing facts from which the observables can be deduced. Different hypothesis can be formulated to explain the same set of observables. By way of illustration, suppose one is waiting for a train to arrive at 10.00 a.m. If the train does not arrive, one can deduce several assumptions. It can be assumed, for example, that the train is just late, or that the timetable has changed, or that the train is canceled, and so forth.

Actually, abduction is often useful in everyday life. For example, it helpful in making a diagnosis: What is the explanation of what is happening? It is also applicable to problem solving: How can I obtain this? As such, abduction is useful in performing view updates on information which has been deduced.

An example illustrates the basic process of abduction. Suppose it is known that George is Mark's parent, and one wants to state that Jack is a brother of Mark. The only way to obtain such a result is by hypothesizing that Jack is male, and that George is Jack's parent. Thus, an update request of:

insert brother(jack, george)

must be translated into:

insert male(jack) and parent(george,jack).

Suppose, on the other hand, one wants to specify that Jane, a female, is a brother of George. Such an update should not be allowed as it would require Jane to be male; she is already known to be female. Thus, performing view updates by abduction includes identifying a set of updates on base relations—relations which allow the request to be deduced from the DB in its new state—all without violating any integrity constraint.

A formal definition also exists. An Abductive Framework may be defined as {P, Ab, Ic}, where:

1) P is a theory composed of Horn clauses with the restriction that predicate symbols in P do not occur also in Ab;

2) Ab is a set of predicate symbols specifying what can be abduced, i.e., ground facts whose predicate symbols are in Ab; and 3) Ic is a set of closed first order formulas.

As an application of the framework, let Q be a closed formula considered as the observable. Q has an abductive explanation through a set of abducibles D if the union of P and D:

1) allows one to deduce Q; and
2) does not violate integrity constraints.

In operation, the Abductive Metainterpreter 30, through intentional rules, generates a complete demonstration tree based on the update request. The root of the tree is deducible from all the leaves and the intentional rules. Once the tree has been generated, the AM 30 identifies the ground facts which meet the update request (goal). More particularly, the AM 30 identifies with respect to the integrity constraints, the abducible leaves (ground facts) which, if inserted into the EDB, indirectly meet the update request. Suppose, for example, that B and C are basic information and that the EDB contains only C; also, assume that the EDB contains the rule:

$$\{B,C\} \rightarrow A$$

(i.e., B and C imply A). With a request to insert A into the Deductive Database, the AM 30 generates a tree which has A as its root and B and C as its leaves; also, it inserts the new fact B in the EDB. Thus, the deducible A becomes new information stored in the EDB.

B. General Operation

Figure 2:
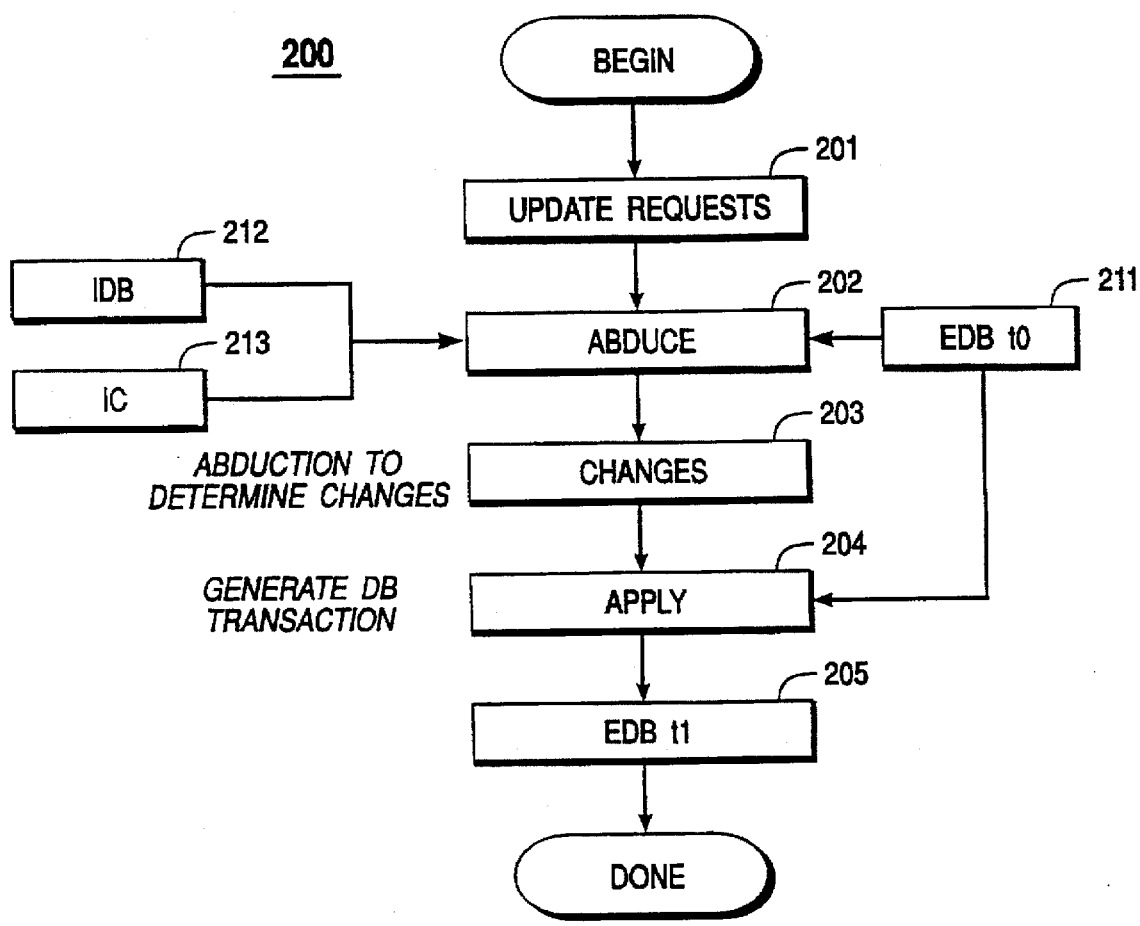
FIG. 2 is a flowchart illustrating overall operation of the system of FIG. 1A, where abduction is employed to determine which changes to the system must be made.

Referring now to FIG. 2, a general update method of the Abductive Metainterpreter 30 is illustrated. At step 201, the system receives, through the GUI 20, update requests, including the insertion or deletion of objects or relationships in the DDB 40. At step 202, the AM 30 receives integrity constraints from the DDB 40; in addition, it accesses the IDB and the EDB (state $T_0$). With this information, the AM 30 identifies the changes to be made to the EDB which satisfy the update request. Thus, in step 203 the changes to be made are abduced. In step 204, the Abductive Metainterpreter 30 generates a database transaction which applies or effects the changes to the database. Once the transaction has been performed on the DDB, the EDB is transformed (i.e., changes from state $T_O$ to state $T_1$). With the EDB at state $T_1$, the user's request is satisfied.

A particular feature of the Abductive Metainterpreter is its ability to explain how it has reached a goal. In fact, using a demonstration tree, the Abductive Metainterpreter generates a set of natural language postulates that can be interactively consulted by the user. This is implemented as an explanation module. An additional feature of the Abductive Metainterpreter is its ability to determine the best path to achieve a goal. This greatly enhances performance, thus allowing complex tasks to be processed in real-time. This feature is implemented as an optimization module.

III. Exemplary Embodiment: Automatic Network Configurator

The following description will focus on implementation of the present invention in a network system as a configurator—an Automatic Network Configurator (ANC). The present invention, however, may be advantageously employed in other systems, particularly where adaptation or configuration is a matter of adapting a knowledgebase of object descriptions, relationships, and constraint definitions. Therefore, the following is offered for purposes of illustration and not limitation.

A. Introduction

In a networking environment, services are provided which permit various operations on network objects. For example, many tools are commercially available that employ a graphical user interface (GUI) to facilitate network operations. While these tools allow a user to manipulate objects, i.e., configure network objects, they are ignorant of configuration in a broader sense. In particular, the user must possess an in-depth understanding of network configuration, including low-level interactions, in order to successfully use these tools. As a result, the user is neither assisted in reaching his or her goals nor prevented from making mistakes.

Even though it is perhaps one of the most difficult tasks in network management, a correct configuration must nevertheless be maintained. For a network to be considered "well-configured," all of these objects must be maintained in defined relationships and satisfy a set of constraints. A large network, particularly those which are described in terms of managed objects, can include millions of network objects, each of which may include a variety of attributes; all of these objects must be maintained. All told, the task of maintaining network configuration is inadequately addressed by present day tools.

Even more difficult than maintenance is the task of reconfiguration (changing) of a network. In this instance, many configuration rules and constraints must be obeyed. Moreover, very few network objects can be configured directly through management services; instead, they are more frequently configured by configuration files, with arbitrary formats and syntaxes reflecting only static information about one or more objects.

Since configuration knowledge may be formally expressed in terms of objects involved, and relationships and constraints existing between these objects, the system and methods of the present invention may be applied to the problem of network configuration. In particular, the system of the present invention includes a knowledgebase system with logic programming in abduction methods for maintaining a network configuration database. Abduction is used as a conceptual framework for the configuration task, with various abductive methods employed for deriving database updates for user requests. In this manner, the need for explicitly programming updates in the system is eliminated, i.e., updates are automatically derived by the system using its own explicit knowledge about configuration, thus freeing the user from these details. Since configuration knowledge is maintained independent of configuration methods, the exemplary embodiment is extensible to a variety of different networks: adaptation to a new network simply requires changing the knowledgebase to accommodate the new object descriptions, relationship, and constraint definitions.

B. Basic Problem: Configuration

A typical network includes a plurality of terminals or nodes for interfacing to host systems. In its simplest form, data communication takes place between two devices that are connected by some form of point-to-point transmission medium. However, it is often impractical for two devices to be directly connected. For example, the two devices may be very far apart, in which case a dedicated link between two devices thousands of miles apart would be impractical. As another example, there may be a set of devices, each of which may require a link to many of the others at various times. In this case, it would be impractical to provide a dedicated wire between each pair of devices.

The solution to this problem is to attach each device to a communication network. Typically, each station (e.g., computer terminal) attaches to a network node. The set of nodes to which the stations attach is the boundary of a communication network; it is capable of transferring data between pairs of stations.

A typical network may employ UNIX machines to interface host systems to some networks, with hundreds or thousands of nodes supported. The nodes implement Transmission Control Protocol/Internet Protocol (TCP/IP) software, or the like. Moreover, each of them may include Open Systems Interconnection (OSI) services, but each may also include proprietary software implementing desired local services, i.e., a set of protocols and services implemented on top of the OSI model. For an introductory discussion of basic communication protocols and hardware, see e.g., Stallings, W., *Data and Computer Communications*, Third Edition, Macmillam Publishing Co., 1991.

For any network, configuration remains a main management problem. For instance, possible changes to the network are almost unlimited: nodes may be added or removed, communication can be allowed or disallowed between different nodes or between entities within the nodes, and changes may be made in a communication entity parameters to handle software or hardware updates, or to tune performance. With current implementations, configuration is an everyday problem, involving tedious, manual editing of thousands of configuration files on She network. And problems may propagate: changes in the configuration of any one node can require changes in the configuration of other nodes (including all other nodes), depending on network topology and access policies.

Thus even for simple networks, configuration is a task requiring complex knowledge, which is not easily solved or handled with standard programming techniques. Specifically, standard application programs, even those using the services of a RDBMS, simply lack the flexibility to track the continuing evolution of a network. What is needed, therefore, is a system which, by itself, can understand the operations of the network which would satisfy a user's request. More particularly, the system should be adaptable, for example, by using a knowledgebase of objects, configuration rules, and constraints. As such, the system may easily adapt to change by adjusting the contents of its knowledgebase.

D. System Construction and Operation

Figure 3:
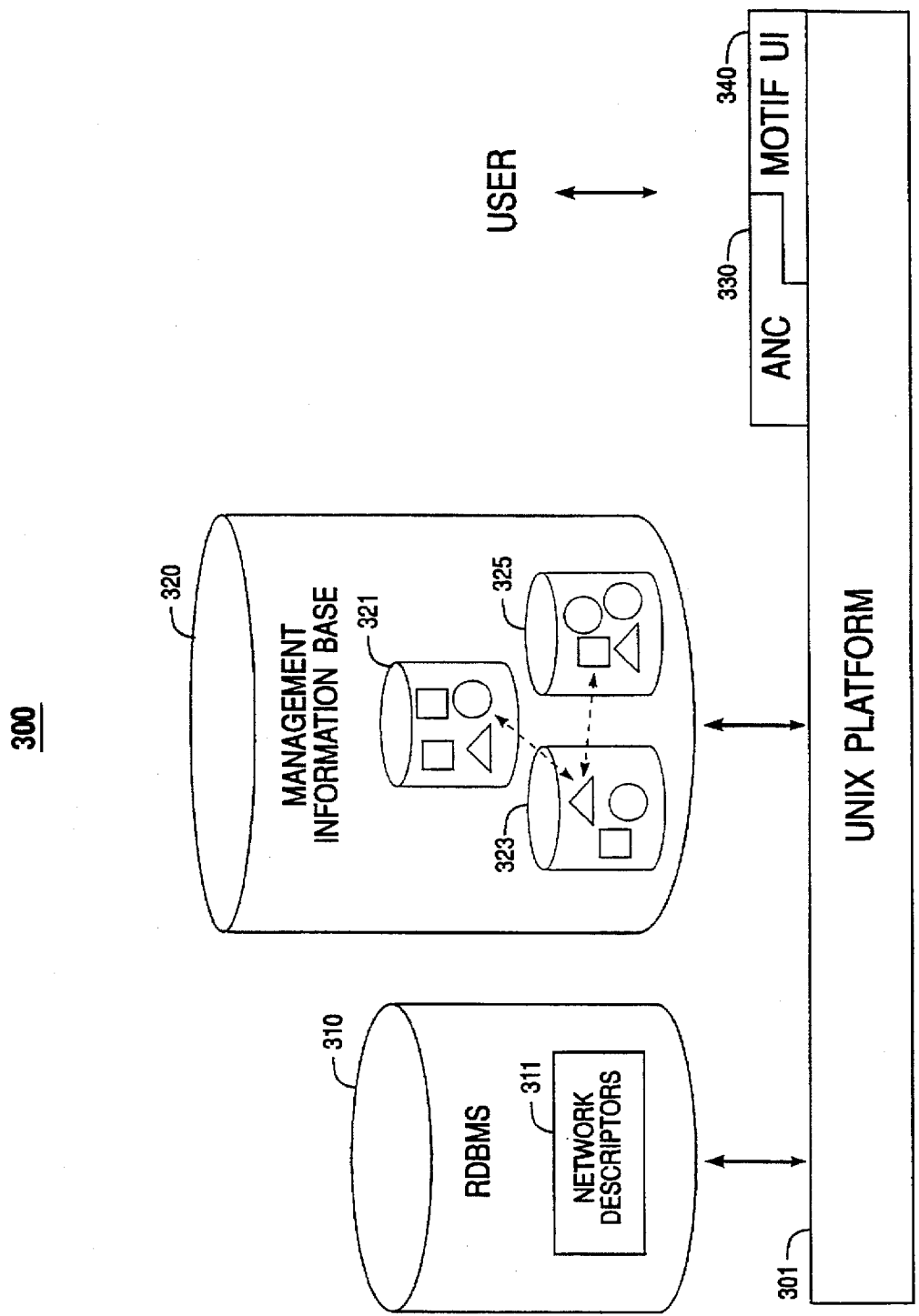
FIG. 3 is a block diagram of a multi-user embodiment of the present invention, particularly adapted for use as an Automated Network Configurator.

Referring now to FIG. 3, a network system 300, constructed in accordance with the present invention, includes a networking platform (e.g., UNIX) 300 having a user interface (e.g., Motif) 340 and an automatic network configurator (ANC) 330 of the present invention. ANC 330 accesses and updates a network description, which is typically stored in a RDBMS (e.g., descriptors 311 stored in RDBMS 310). In addition, system 300 includes a Management Information Base (MIB) 320. In turn, MIB 320 includes a plurality of container objects (e.g., containers 321, 323, 325), each of which may include a plurality of objects. As such, MIB 320 corresponds to the EDB 41 of system 2. Rules for defining relationships and properties of objects in the MIB are stored in the IDB.

GUI 340 permits the user to inspect and manipulate objects in the MIB 320, display a physical metaphor of the network (e.g., show that two ports are connected by a cable), and browse the MIB along containment relationships, including inspecting the contents of each container object (i.e., zooming into container objects). Thus, the ANC 330 provides the inspection and manipulation of relationships between objects, provides and explanation of their meaning (even when they are very complex), and provides browsing of the MIB along any defined relationship, not just containment ones. Given an object, therefore, it is possible to see which other objects are within it in a given relationship, including being contained, being known, and being currently associated. Typically, these relationships will be deduced from the state of the MIB objects and, thus, cannot be drawn by the user himself.

In a preferred embodiment, the ANC uses graphics to express objects and their relationships. In this manner, the preferred interface model is one of directed graphs: objects are represented by graphical nodes (icon), with relationships represented by arcs. Both objects and arcs can be manipulated and queried by the user. Alternatively, a graphic browser is provided to permit the user to "navigate" among the objects, particularly in those instances where too many objects are present in a given relationship with an object of interest.

An overview of the network configuration task itself will now be presented. The term "configuration," as used in this example, refers to the generic problem of producing an instance of a concept which satisfies given specifications. The problem of maintaining configuration, for example, may be restated as the task of maintaining an object (the MIB) that changes according to user's requests, but nonetheless always maintains given properties (i.e., remains consistent). The term "configuration" is not particularly specific to the task at hand but, more particularly, specific to the object of such task, the network configuration. As such, the configuration becomes the constraints (IC) the system must respect.

The network configuration task may be stated in pseudo code, as follows:

---

Start get user's Requests;
Repeat
  Using Network Configuration Model and the Current MIB state
    Devise the Updates to perform;
  Apply Updates on Current MIB to obtain New MIB;
  Verify the New MIB State;
Until MIB State is consistent or no solution
If MIB State is consistent
Then
  Select the Configuration Files to Update to reflect the New MIB State;
  According to the Configuration Files to Update by using Updates and Configuration Files Model, actually Produce required Configuration Files.

---

Figure 4:
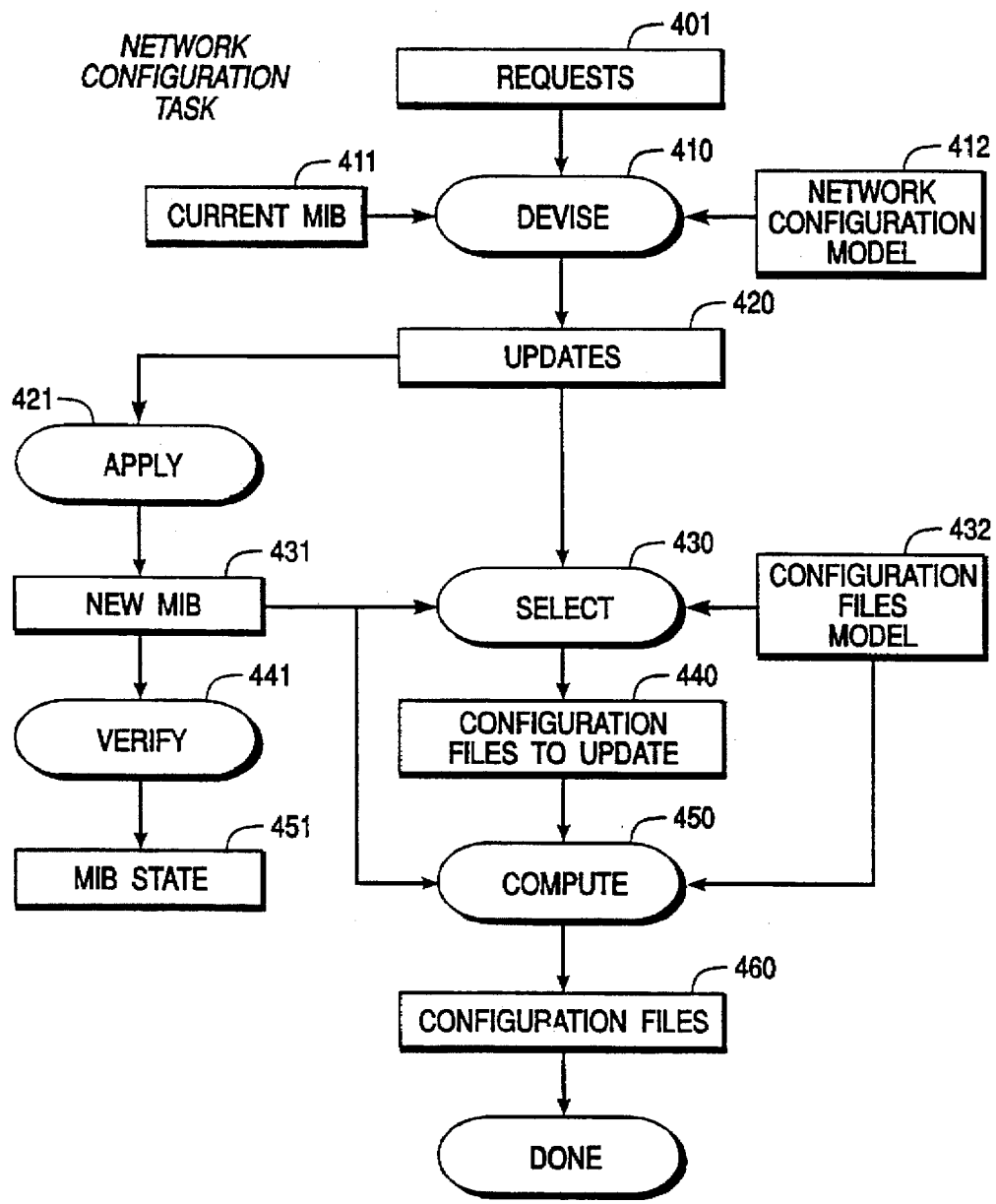
FIG. 4 is a flowchart illustrating the method of the present invention for processing requests (network configuration tasks), in an Automated Network Configurator embodiment.

As shown in FIG. 4, a network configuration method 400 is provided for performing the task of network configuration. The following description will focus on the individual steps or functions (shown in rounded boxes) and their operations on data members (shown as regular boxes).

The steps of the method 400 proceed as follows. At step 410, a devise function receives Requests 401, which are MIB properties that are to be made true. Thus, the Requests are updates to be performed on view relations. In addition, the devise function also receives the current MIB 411 and the network configuration model 412. The devise function performs an abduction task, with requests as the MIB properties that are to be made true; in turn, the function provides updates 420—a set of assumptions that will verify the desired properties.

The function may include varying degrees of intelligence or flexibility, as desired. For example, all requests may be specified beforehand, in which case an appropriate set of transactions can be identified and implemented. Alternatively, requests may not be known beforehand; in this instance, a reasoning mechanism will be employed. Similarly, the input modules may include flexibility. The network configuration model, for example, may be a simple model, requiring a simple, deterministic, transaction-to-transactions processing. Alternatively, it may be a very complex model, including strategies for searching a solution space, with full problem-solving capabilities.

Using straightforward updating techniques, the current MIB is updated and verified. Specifically, the updates 420 are applied to the current MIB by apply function 421, thus yielding a new MIB 431. A verify function 441 then checks or verifies that the MIB (either a current MIB or a new MIB)

is consistent with respect to the set of constraints specified in the network configuration model 412. As input, the function receives the network configuration model, current MIB, and updates. As output, the function supplies MIB state 451—a state which satisfies the user's request. The function can be implemented in a variety of ways, according to the expressive power of the constraints. For example, expressive power may be low (i.e., only standard entity and referential integrity) or high (i.e., full first order of logic). In the latter instance, complex constraints are accommodated as well.

The updates 420 are also supplied to a select function 430. This function selects a set of configuration files to update 432, i.e., rewriting to reflect the state of the new MIB. Thus as output, the function provides a set of configuration files 440. In operation, the function follows or traces dependencies between the configuration files and objects in the MIB, according to the Configuration Files Model 432.

The Configuration Files to Update 440, along with the current or new MIB and the Configuration Files Model 432, are provided to a produce or compute function 450. In operation, the function derives specified configuration files from the MIB state. While the configuration files may be derived in different ways, each can be considered as a report on a database.

Next, data specific to the method 400 will be described. The Requests 401, which are the main input to the system, represents the user's real intention and the specification of the MIB's desired state. A typical request is expressed in terms of object manipulation, for example, the creation or deletion of an instance. Alternatively, requests may be expressed in terms of relationships existing among objects, such as "make true that two given entities can talk to each other."

Network Configuration Model 412 may be explained as follows. Network configuration is performed upon objects, which are defined in detail using given rules specifying the existence of relationships among instances, and given constraints which must be satisfied. Object definitions, relationship definitions, and constraints constitute the knowledge specific to network configuration. As such, this knowledge can be represented and used to devise updates on the MIB. Thus, adapting the ANC to a different network is simply a matter of changing this knowledge.

The current MIB 411 is a database representing all objects in the network. From this set, a subset of configuration objects may be derived, i.e., those which are meaningful for configuration. While configuration objects tend to be static in nature, other network objects (e.g., associations and messages) are typically very dynamic and not easily represented in DBMS format. The real MIB comprises a set of real objects on the network, which is operated upon with available network services. Information about these objects is stored in a database, which is informally called MIB.

Updates are insertion or deletion operations performed on the MIB. These can be performed either on objects, or on relationships between objects, such as inserting or deleting the fact that two entities can communicate. The new MIB is obtained by applying a set of updates to the current MIB. The configuration file model, on the other hand, includes knowledge specifying how to derive configuration files from the MIB. Configuration files, in turn, are considered as reports on the MIB, i.e., partial views of the MIB contents (with an arrangement which is specific to an implementation). These may be read by scripts or processes for configuring the real network objects.

E. ANC system

Figure 5:
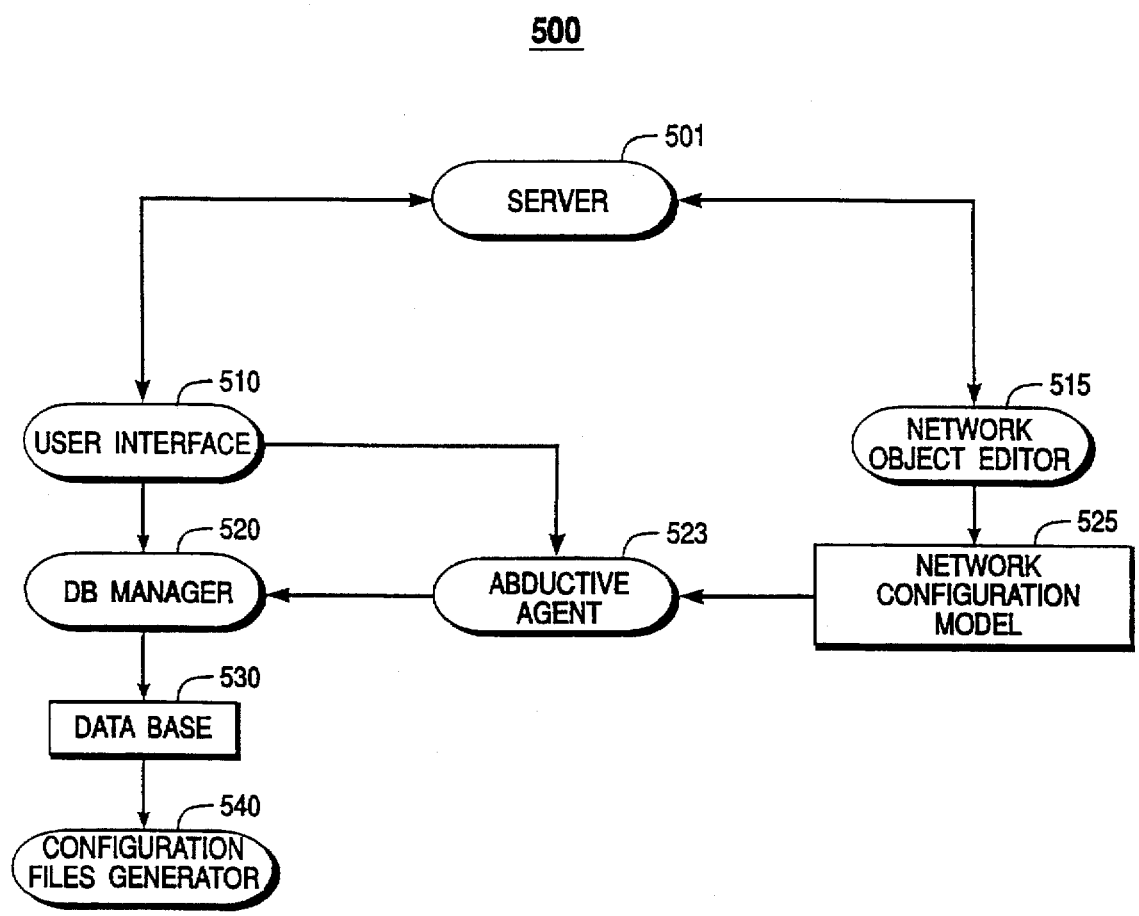
FIG. 5 is a dataflow diagram further illustrating the Automatic Network Configurator of FIG. 3.

As shown in FIG. 5, the ANC system 500 includes a User Interface 510, a server 501, a Network Object Editor 515, a Database Manager 520, an Abductive Metainterpreter or Agent 523, and a Configuration Files Generator 540. In general operation, a Network Configuration Model 525 is created by using the Network Object Editor 515. (We use the terms Abductive Metainterpreter and Abductive Agent interchangably herein.) Through User Interface 510, the Abductive Agent 523 receives Requests from the user. In turn, the Abductive Agent 523 accesses the Network Configuration Model 525 and the Database 530, through Manager 520, to devise the updates required for the system.

1. User Interface

Each component will now be described in further detail. User Interface 510 is implemented as a master module, which interfaces with the server 501. In this manner, the interface serves as an extra layer on top of a Motif UI. In an alternative embodiment, implemented in the Macintosh OS (Apple Computers, Cupertino, Calif.), the interface employs MacProlog graphic primitives. Regardless of implementation, however, the system will preferably use the same or similar application programming interface (API). In general operation, the UI module 510 translates user graphic manipulations into calls to the Abductive agent 523 or to the Database Manager 520.

2. Server

Server 501 is preferably implemented as an extra layer above the Motif interface, thus easing development of the user interface. In a preferred embodiment, the server is implemented in S.I.X. (System Interface in X-Windows), which is capable of communicating with a client process using a simple, object-oriented protocol and API. The API may provide support for creation and deletion of an object, action on an object, notification received from an object, setting and getting up object attributes, and the like. As such, these functions are capable of operating upon graphic objects defined within the system, such as windows, fields, icons, and the like.

3. Database Manager

Database Manager 520, on the other hand, provides a means for accessing the Database 530. As such, the module answers queries posted through the user interface 510, and it also provides a pathway for other modules of the system to access the Database 530. Database manager 520 includes a component for enforcing constraint verification.

4. Abductive Agent

Abductive Agent 523 provides intelligence for the ANC. Employing abductive methods, the component understands which updates should be performed on a database to satisfy a given goal. In a presently preferred embodiment, Abductive Agent 523 includes a Prolog meta-interpreter (i.e., an interpreter for a Prolog variant) and supports the following application programming interface (API):

Abduce (goal, update, trace)

where: goal is a logic formula to be made true or false (i.e., an insertion or deletion of objects or associations); update is a set of changes or updates to perform on the current database to achieve the goal; and trace is a data structure useful for tracking the Abductive Agents internal workings (e.g., debugging).

The overall operation of the Abductive Agent 523 is similar to that described for the AM 30. The update to perform is considered as a goal to be demonstrated. Its demonstration is, then, a proof tree in which leaves are instances of base relations and nodes are instances of view relations. Leaves are added or removed, as required, to produce the desired proof tree.

In designing an abductive agent, tradeoffs between power (accuracy) and efficiency (speed) exist. Typically, the more powerful the abductive techniques are, the more likely the abductive agent will be inefficient. In the presently preferred embodiment, some MIB manipulations are performed by functions which call the Abductive Agent 523. In this manner, the preferred embodiment includes a very efficient implementation of the Abductive Agent; translating requests to updates actually occupies a very small fraction of the entire process. This also results from the deterministic nature of most of the configuration rules in the knowledgebase. In the event that most of the configuration rules are implemented as nondeterministic, a larger search space would typically be required, with concomitant increase in response times.

5. Configuration Files Generator

The other modules of the system 501 function as follows. Configuration Files Generator 540 includes a set of Prolog functions and can produce any required configuration file (to achieve the goal). Moreover, it is capable of understanding which configuration files must be rewritten after an update operations.

6. Network Configuration Model

Network Configuration Model 525 includes a knowledgebase having two parts: 1) objects description and 2) relationships and constraint descriptions. As suggested by its name, the objects description describes the various objects in the system. Preferably, objects description is an OSI management-compliance set of data, which employs a syntactical variant of OSI management templates; most preferably, enriched with relational model concepts such as key, foreign key, default value, and the like. In the presently preferred embodiment, objects description is implemented as a set of Prolog descriptions, which are easily translatable to Network Management Form (NMF) templates.

The rule format or description employed by the Abductive Agent 523 will now be described. Rules are preferably implemented as horn clauses having the following format:

conclusion when condition 1 and . . . and condition N

Thus, the conclusion is true when all conditions are true. The Horn clause syntax has the advantage of being rather straightforward in form and, thus, easily understood by users. It shares much in common with SQL queries which are common in front-end or end-user DBMS tools. Moreover, its simpler syntax is typically easier to understand than other user-oriented languages, such as spreadsheet (e.g., Lotus 1-2-3) macro languages.

By way of example, the syntax will be demonstrated. An example rule may be defined as follows: The network high level goal is to let entities of class "ua" (user agent) talk to each other.

To be able to communicate, two such entities must first know each other's identifier. Such knowledge is represented in the MIB by objects contained in each UA, called "known UA," which are mainly rows in an association table. The "ua knows ua" rule can be stated as follows: ua U1 knows ua U2 when each ua contains a knownUa whose "knownUa" attribute is set equal to the "ua" attribute (the unique name) of the other ua.

This may be formally described as the following rule:

```
U1 know U2 when
{ U1 is a ua where [ua=E1Id] and
  U2 is a ua where [ua=E2Id] and
  K1 is a knownUa where [knownUa=E2Id] and
  K2 is a knownUa where [knownUa=E1Id]
} and
  exist U1 and
  exist U2 and
  U1 contain K1 and
  U2 contain K2 and
  exist K1 and
  exist K2
```

The first or rule part (i.e., the clause between the curly brackets) specifies something about object types and attribute values. The second or logic part specifies logic conditions that define the truth of the rule consequence (that U1 knows U2).

While the rule has only one logical meaning, it can be used in two very different ways: deductive and abductive. The deductive technique states:

to check whether U1 know U2 verify that

This reasoning technique, in contrast, amounts to view processing in RDB.

The abductive usage, on the other hand, states:

if you want to obtain that U1 knows U2 then obtain that two knownUa objects exist contained in the ua's satisfying given condition.

The AA 523 employs these rules in the latter way: when asked to satisfy a request it recursively tries to satisfy all its preconditions, adding or deleting whatever object(s) is needed to achieve its goal. In this specific example the AA would add the required knownUa's, if they were not already there.

A little more information is required by the AA 523, specifically, which information should be abducible and which should not. To accommodate this added information, the foregoing rule may be rewritten as follows:

```
U1 know U2 when
{ U1 is a ua where [ua=E1Id] and
  U2 is a ua where [ua=E2Id] and
  K1 is a knownUa where [knownUa=E21d] and
  K2 is a knownUa where [knownUa=E1Id]
} and
  n @ exist U1 and
  n @ exist U2 and
  n @ U1 contain K1 and
  n @ U2 contain K2 and
  y @ exist K1 and
  y @ exist K2
``` where, the y's and n's preceding the "@" character specify whether abduction is allowed (y) or disallowed (n) on the following subgoal. These simple annotations on rule preconditions help the AA to identify the correct set of updates to preform.

Continuing the example, for two ua's to be able to talk, each must, apart from knowing each other, be a client both of X400 and ROS entities. These entities, in turn, must be local to their clients and must be capable of communication. The formal translation may be written as:

```
        U1 talk U2 when
      { U1 is a ua and
        U2 is a ua and
        X1 is a mtaeX400 and
        X2 is a mtaeX400 and
        R1 is a mtaeRos and
        R2 is a mtaeRos
      } and
        y @ U1 know U2 and
        y @ U1 service X1 and
        y @ U2 service X2 and
        y @ U1 service R1 and
        y @ U2 service R2 and
        y @ X1 talk X2 and
        y @ R1 talk R2
```

A particular feature of this "talk" rule is the ability to express preconditions in terms of other rules ("know", "service", "talk" itself), recursively. In this way the satisfaction of a goal can result in a very deep level of reasoning, which imparts added intelligence to the system. In this fashion, a goal or subgoal can also be satisfied in different ways.

7. Metwork Object Editor

Network Object Editor 515 is a graphic editor of network objects, which allows users to completely specify network objects in a Common Management Information Service (CMIS) compliant fashion. Editor 515 manages a database of descriptions, with capabilities for reading and writing OSI templates, NMF templates, and HP openview templates. These templates include syntaxes which allow standard specification of objects, including their attributes and behaviors. In this manner, editor 515 operates as a CASE tool for object definition, which adheres to CMIS modeling.

While templates define specifications and behavior for objects, they do not specify relationships and constraints. As a result, editor 515 includes an additional syntax for expressing this latter type of information. Thus, relationships and constraints are also specified in the NOE 515, as desired.

F. General Operation

Through abductive reasoning, the ANC operates on the MIB. This requires a clear, formal specification of objects, their relationships and integrity constraints. The resulting system is still a DB application, but a very smart one. It is capable of adapting its behavior to changes in the knowledgebase (KB). Updates need not be coded in advance but, instead, are computed by the system. Thus, the development effort is greatly decreased and mistakes are substantially reduced or even eliminated. Moreover, the resulting system has full reasoning capabilities to tackle unforeseen situations or and even explain its behavior.

Figure 6A:
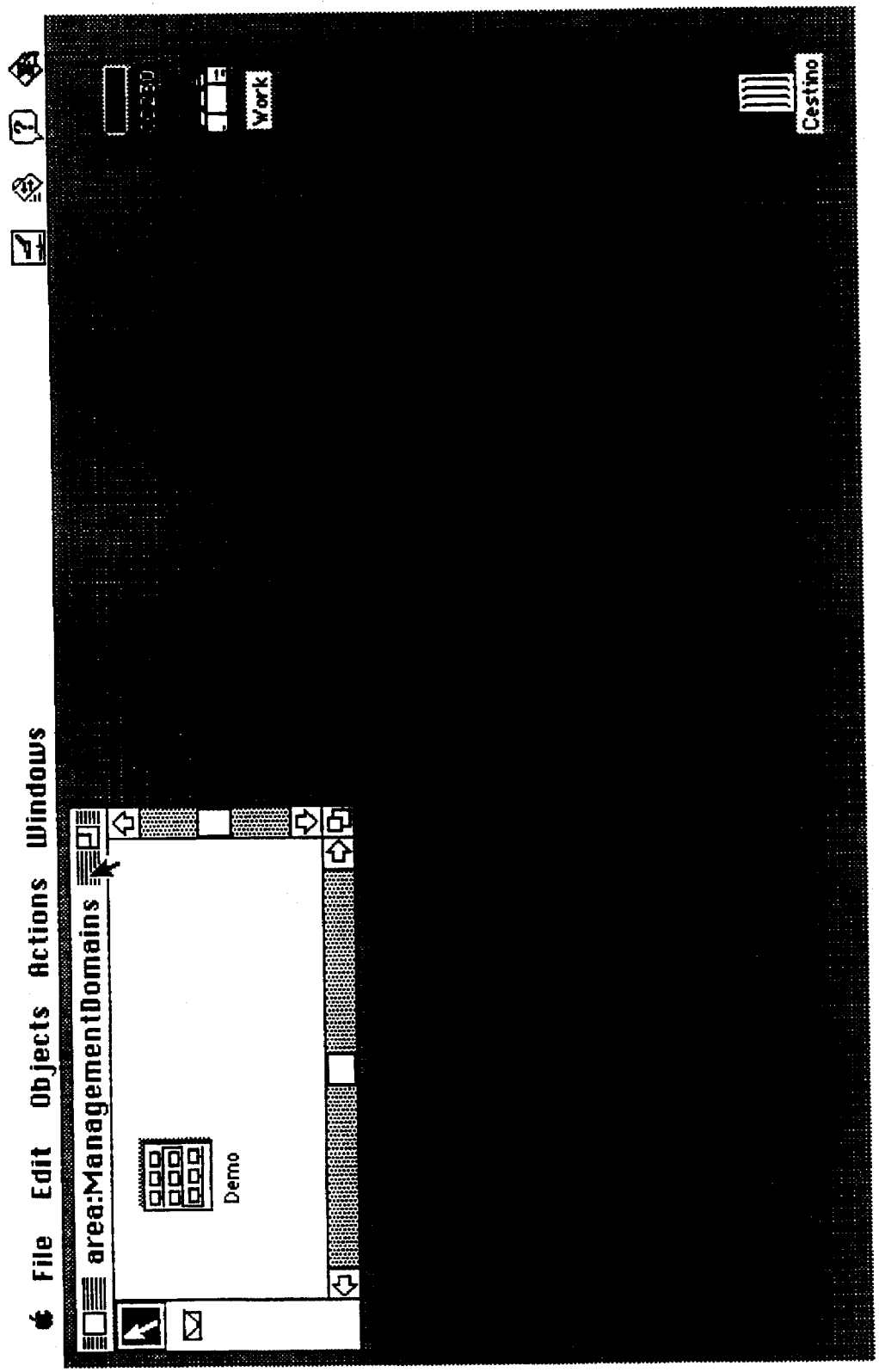

FIGS. 6A–L illustrate the operation of ANC 330. As shown in FIG. 6A, an existing Management Information Base (MIB) is opened, i.e., loaded into system memory 12. Upon opening, the user is shown a window of a particular view of the MIB. The window includes an icon, labelled "Demo," which represents a "domain." In this case the domain is a set of Unix systems.

Figure 6B:
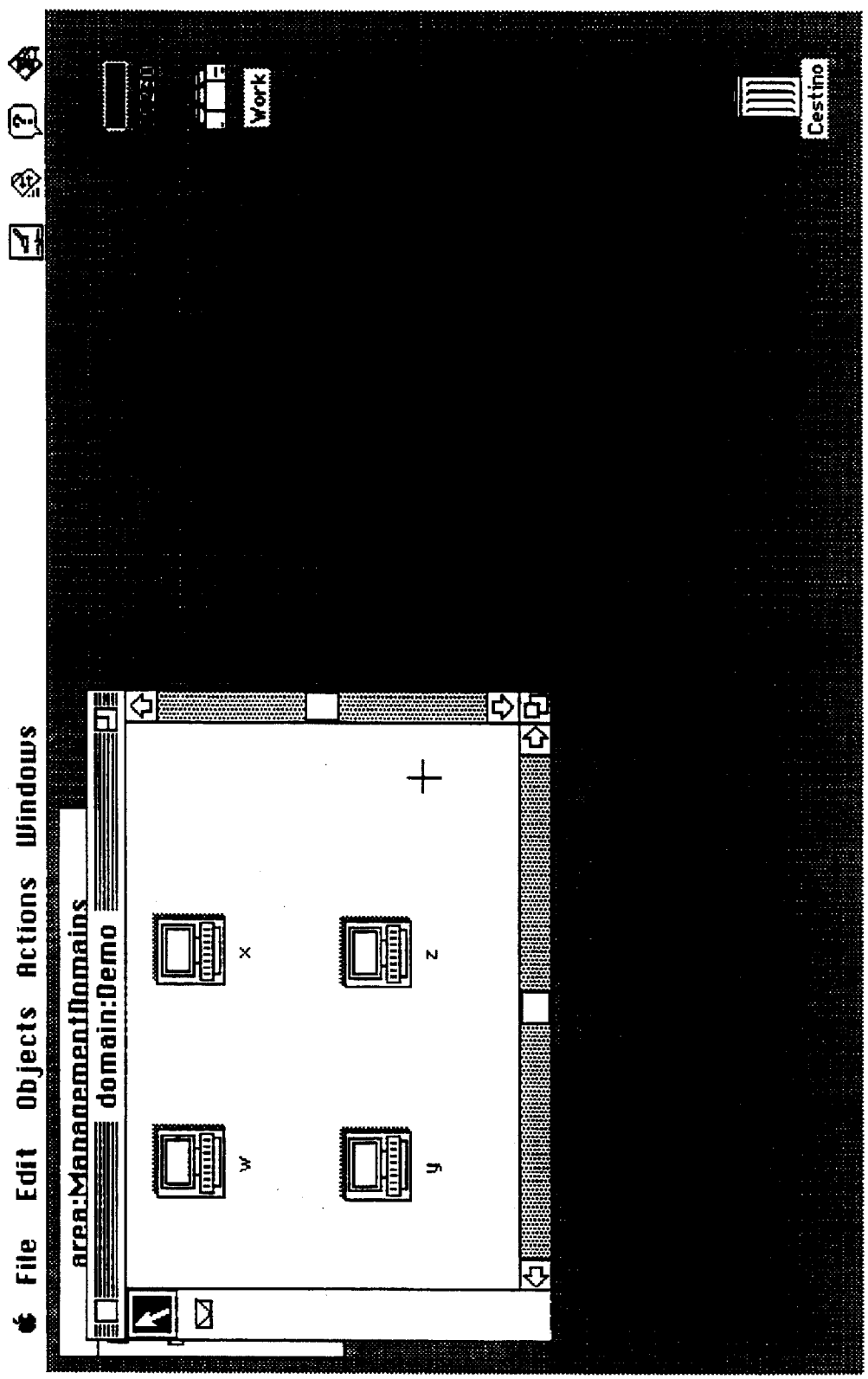

Once the domain is opened, as shown in FIG. 6B, another window appears showing four icons which represent Unix systems.

Figure 6C:
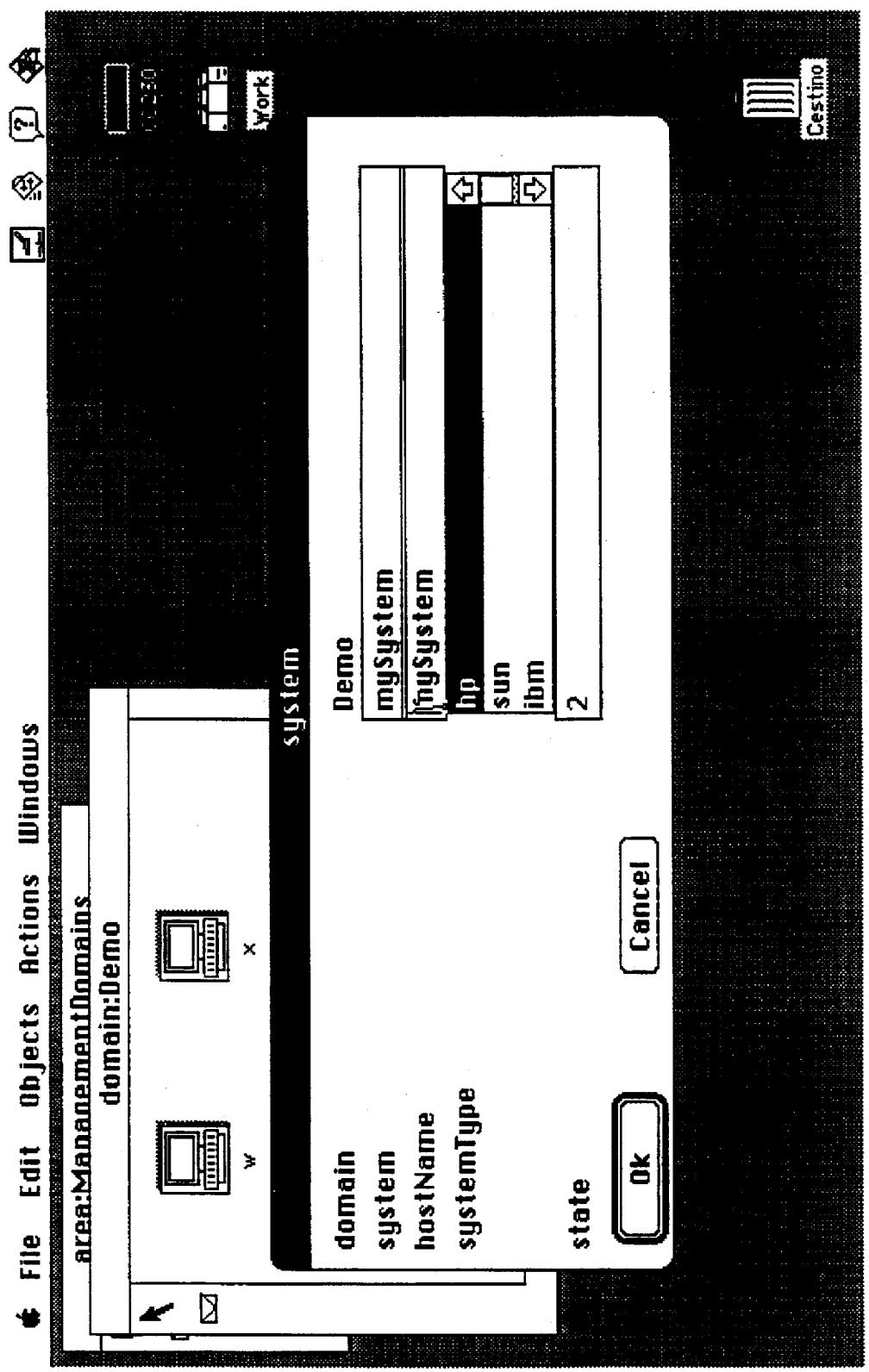

As shown in FIG. 6C, the user is now allowed to create a new Unix system by sending the "create" message to the window. This results in a dialogue, to be completed with the attributes of the system. Sample attributes are shown in FIG. 6C.

Figure 6D:
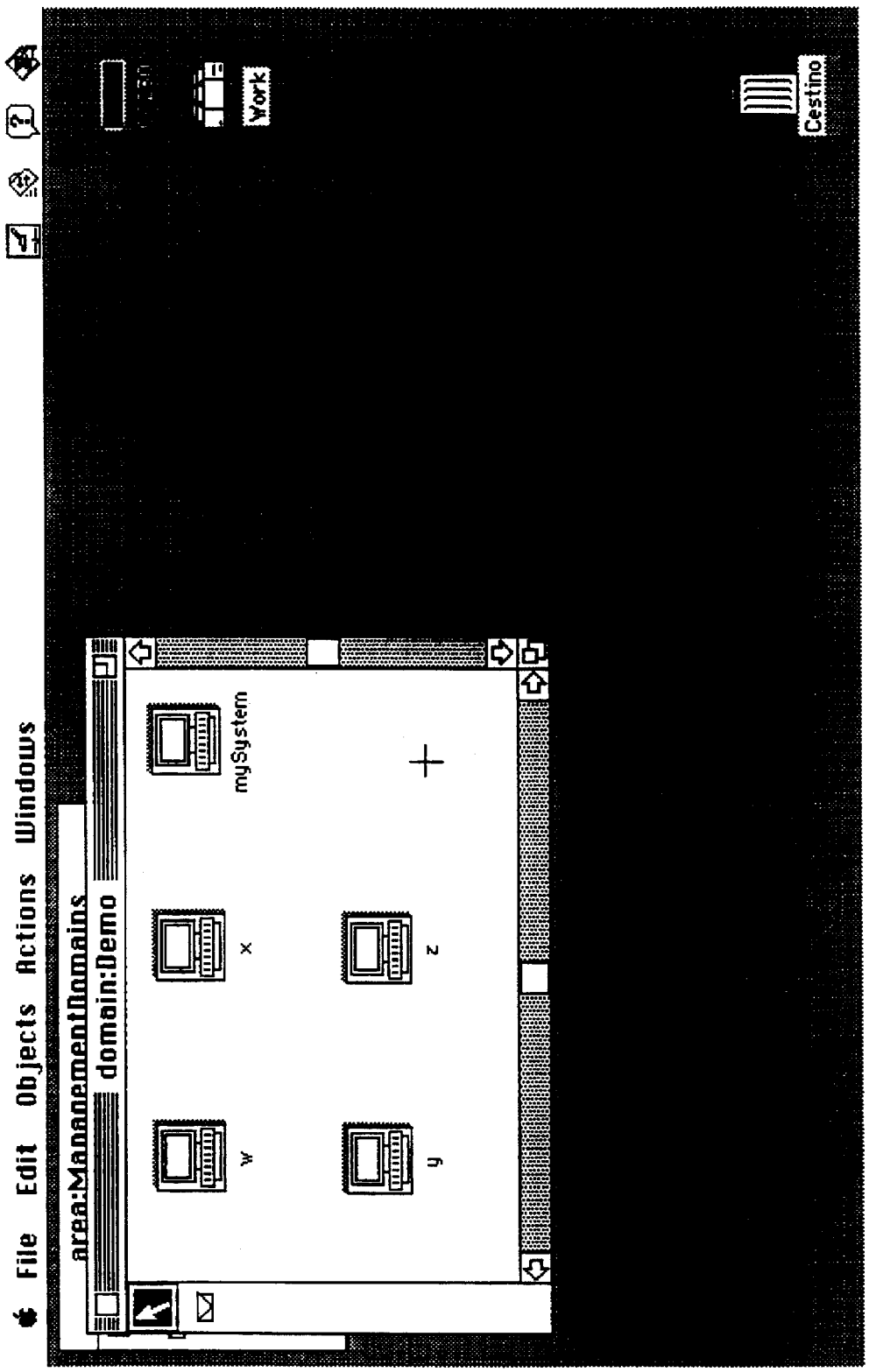
Figure 6E:
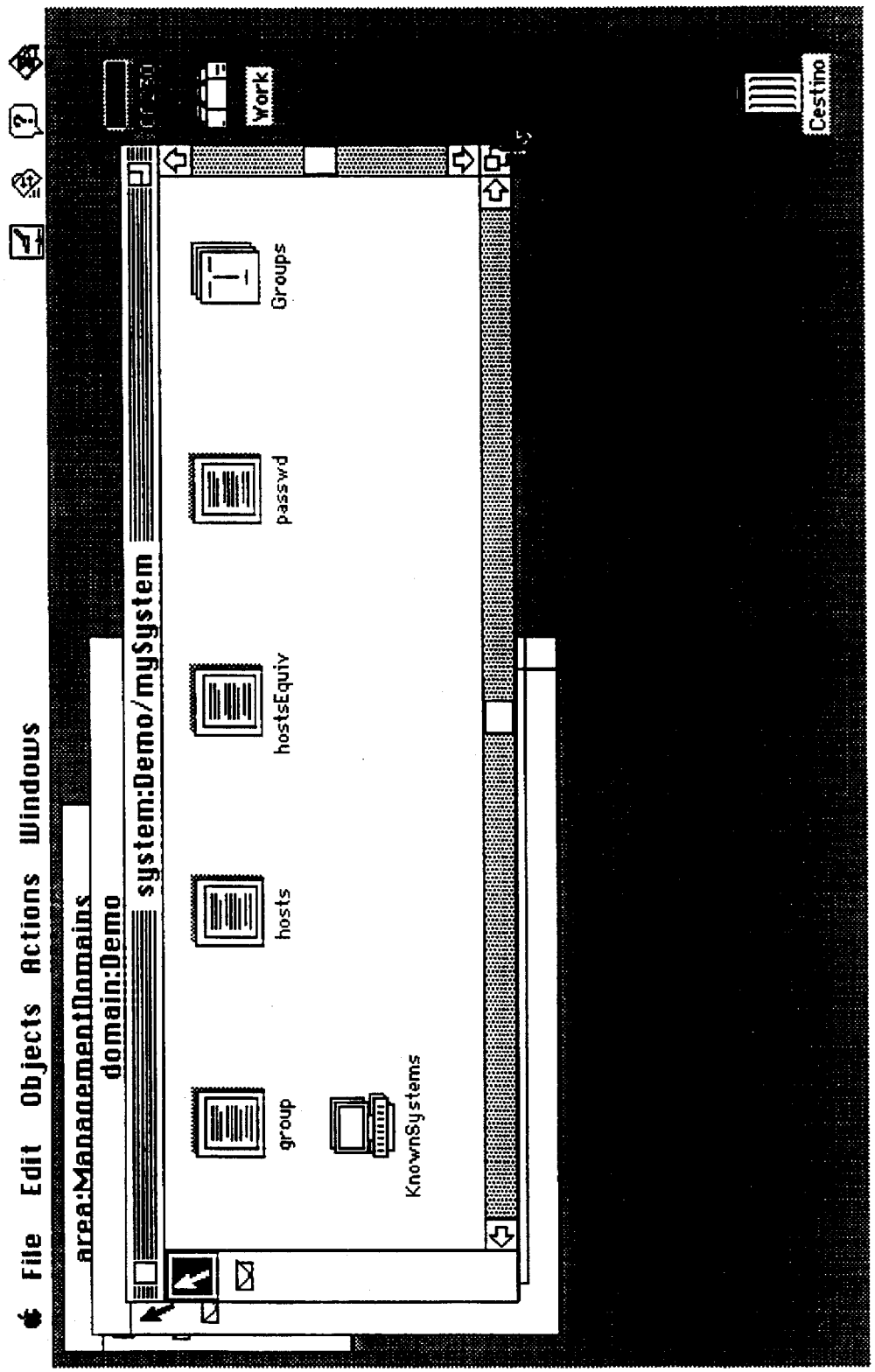

Next, as shown in FIG. 6D, a new icon appears in the domain window. The new icon represents the "mySystem" object. By opening the icon "mySystem," as shown in FIG. 6E, this object has been created along with many other objects.

Figure 6F:
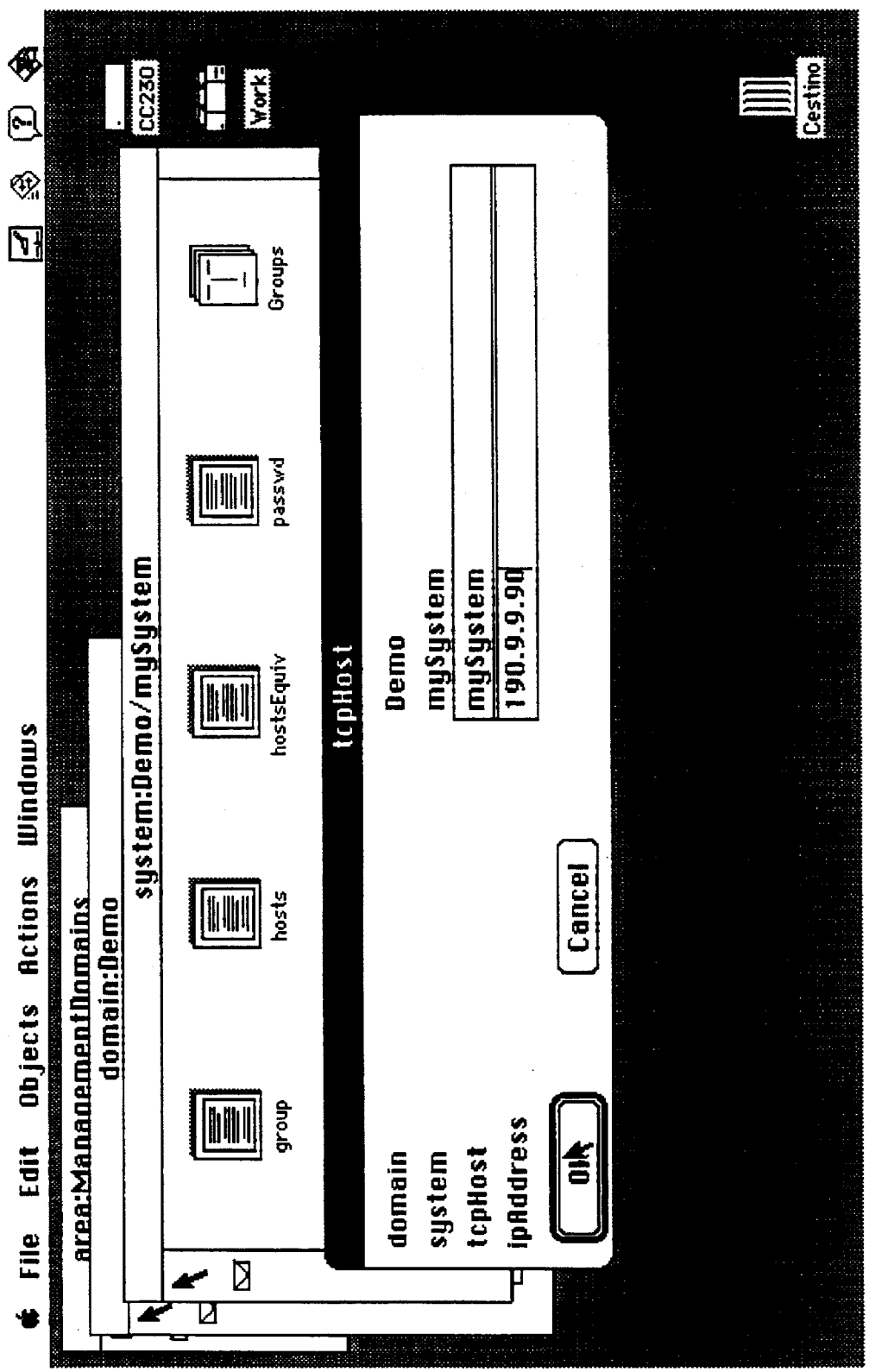
Figure 6G:
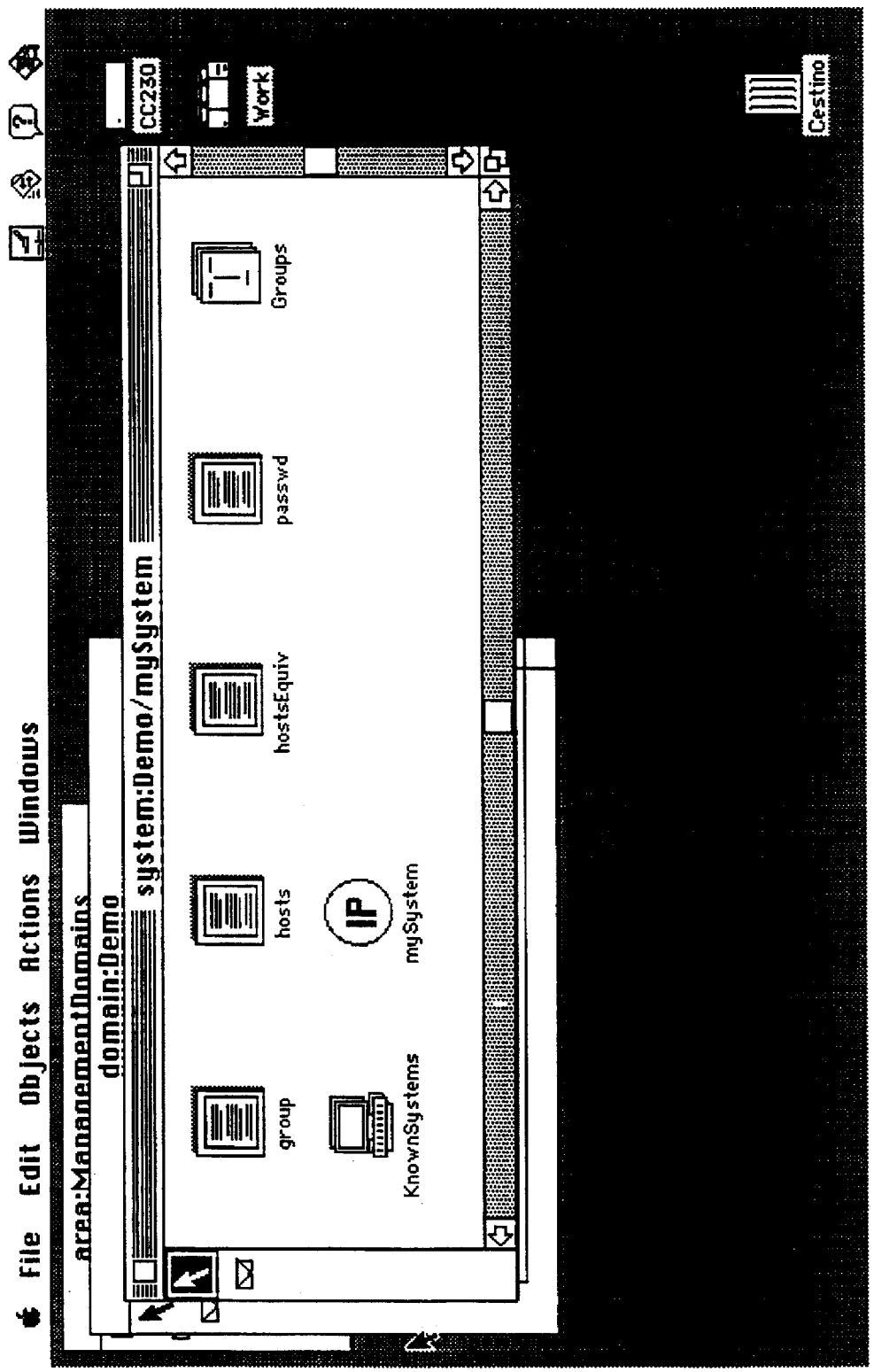

Next, as shown in FIG. 6F, the user can provide an IP-Address for this system. The object is created in a well configured manner. (See FIG. 6G.) The "mySystem" system can now be connected to all the other systems in the window.

Figure 6H:
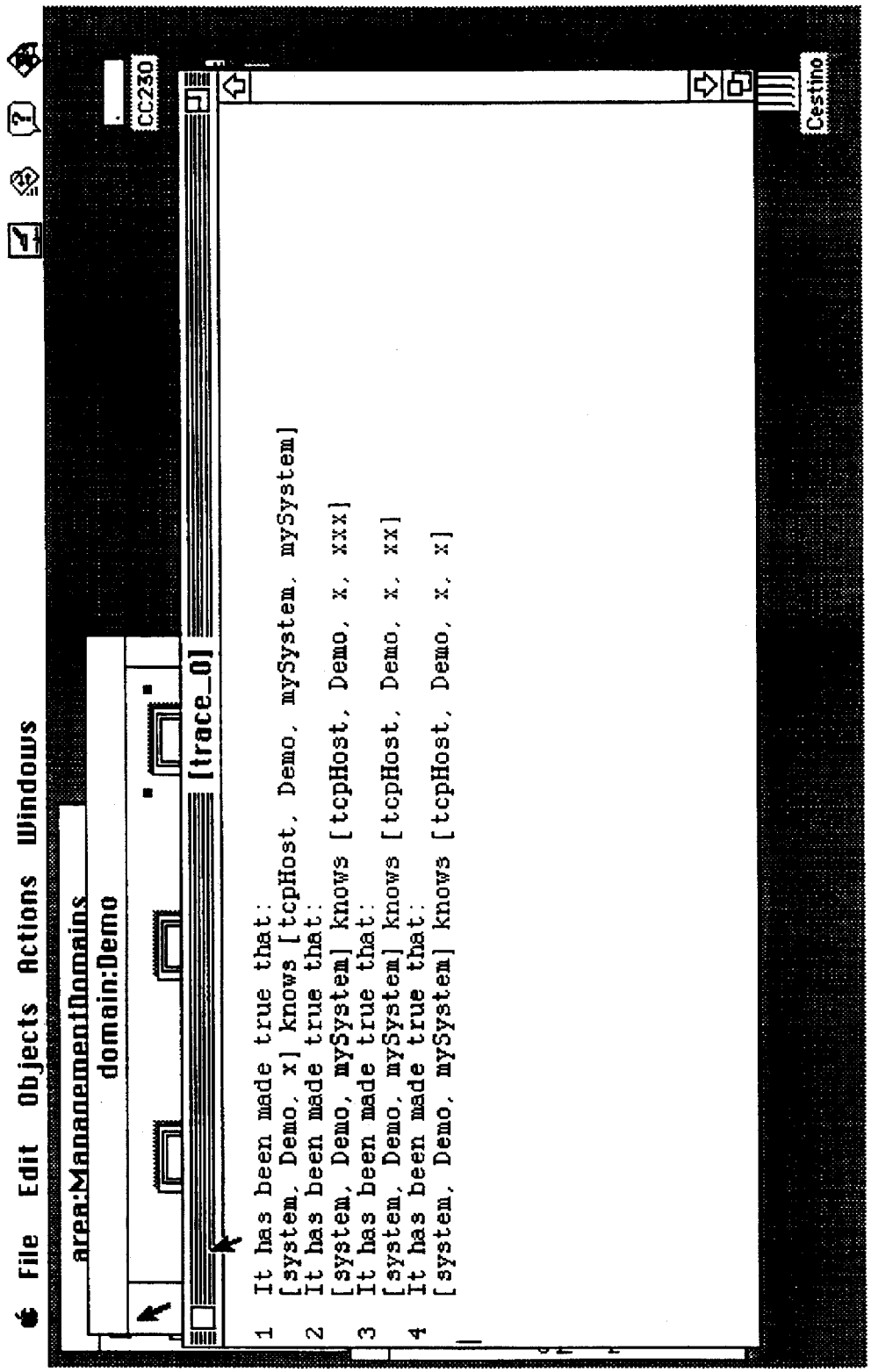
Figure 61:
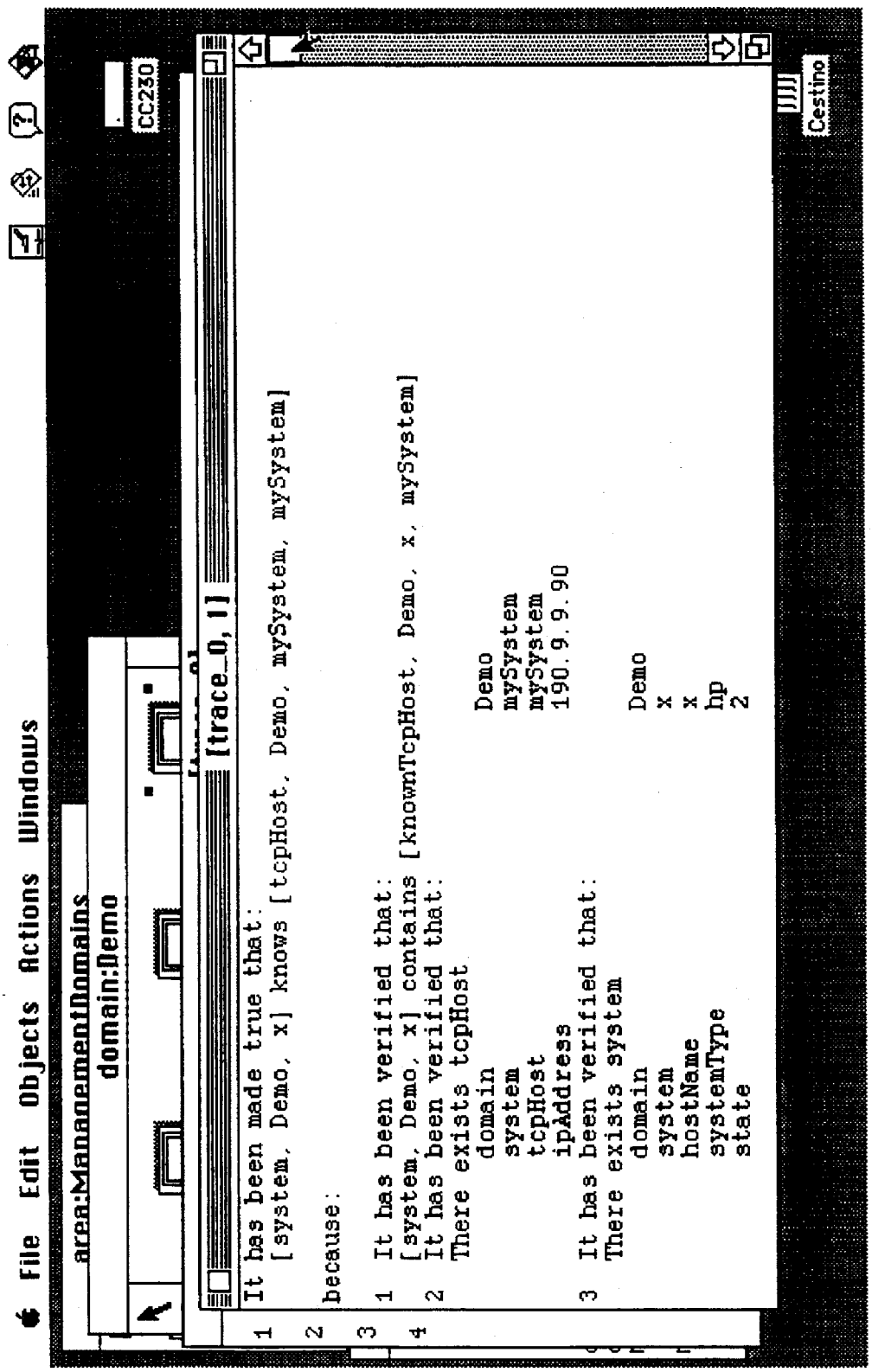

FIG. 6H illustrates how the user can ask the system what the ANC has done to reach the desired goal. If this request is made, a text window appears explaining the details of the operation. Sample text is shown in the figure.

FIG. 6I shows how any line of the explanation of FIG. 6H can be selected, and then expanded to provide further detailed information.

Figure 6J:
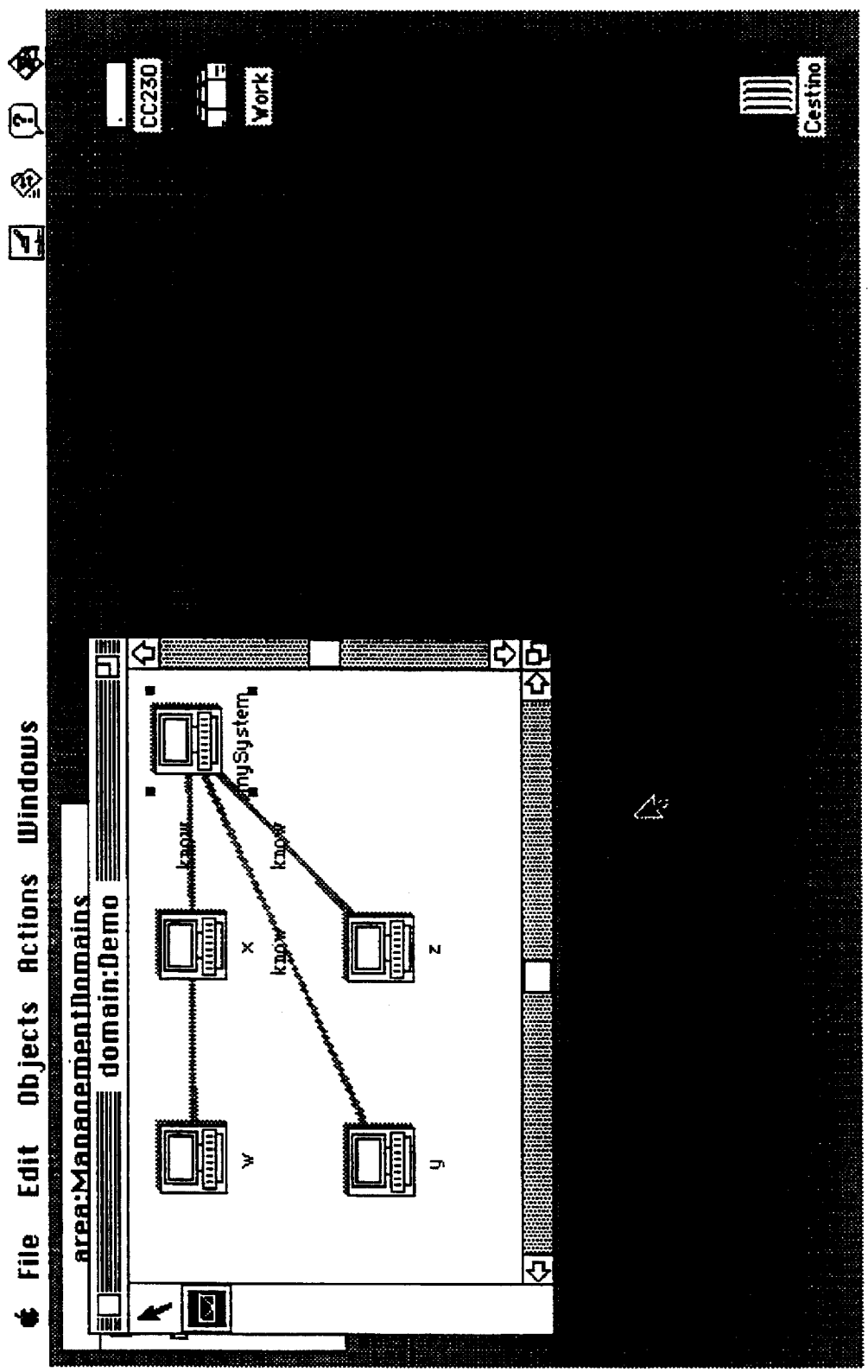

FIG. 6J illustrates another feature of the system. In FIG. 6J, the user has sent a "show relationships" message to the window. As a result, a set of arrows representing the existing relationships appear in the window.

Figure 6K:
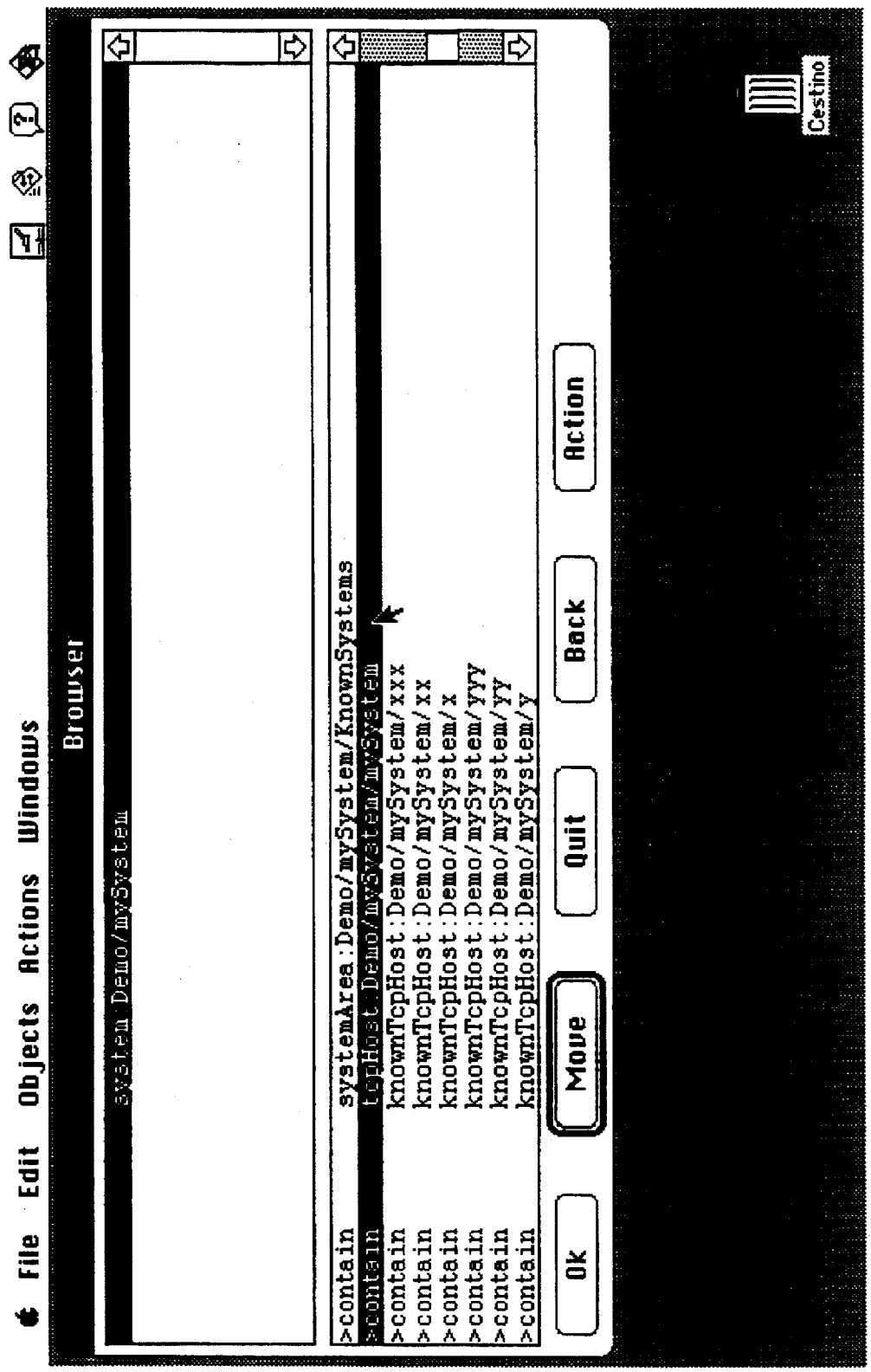
Figure 6L:
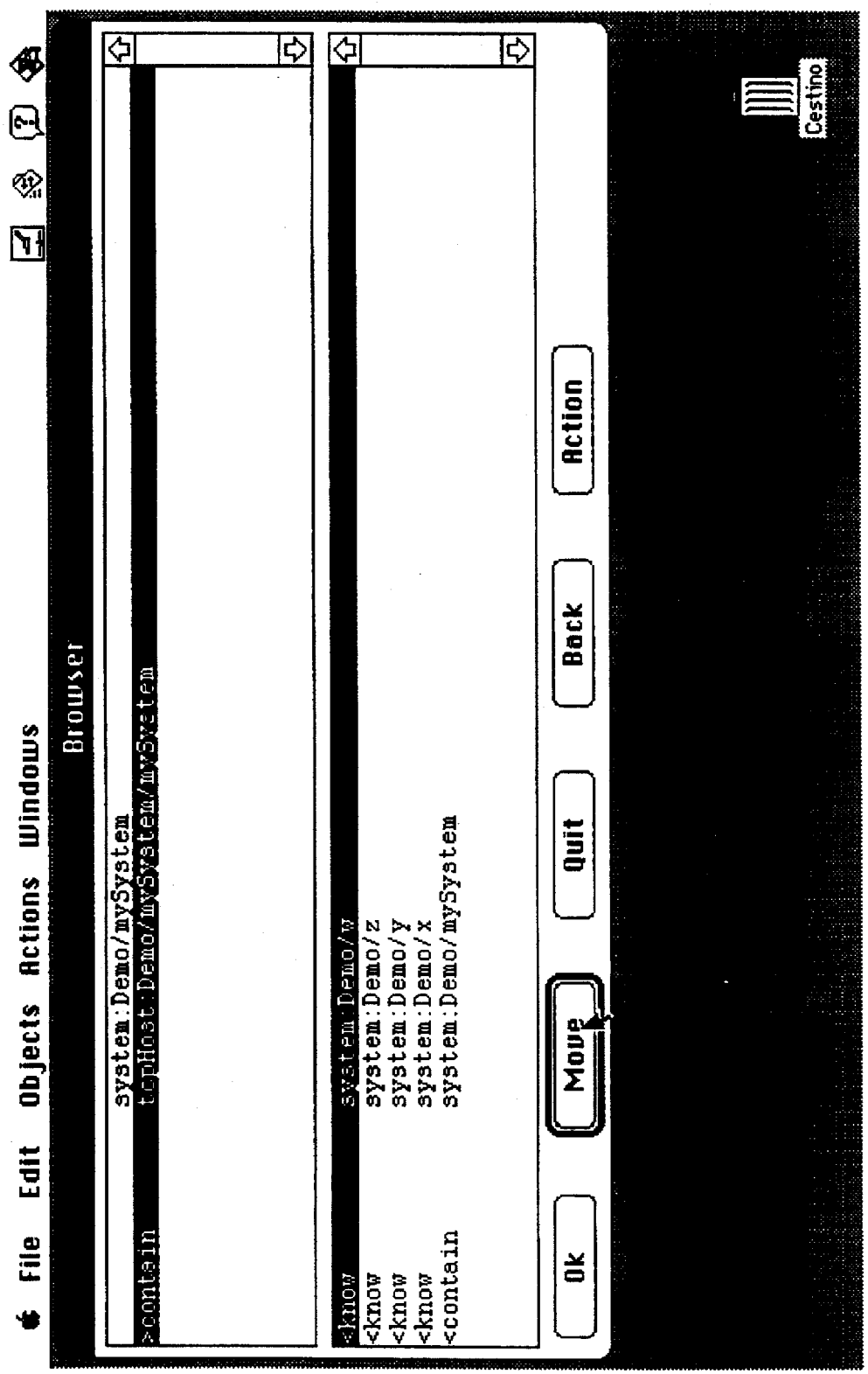

FIGS. 6K and 6L illustrate another way of viewing the relationships among objects by using the browser.

Figure 7A:
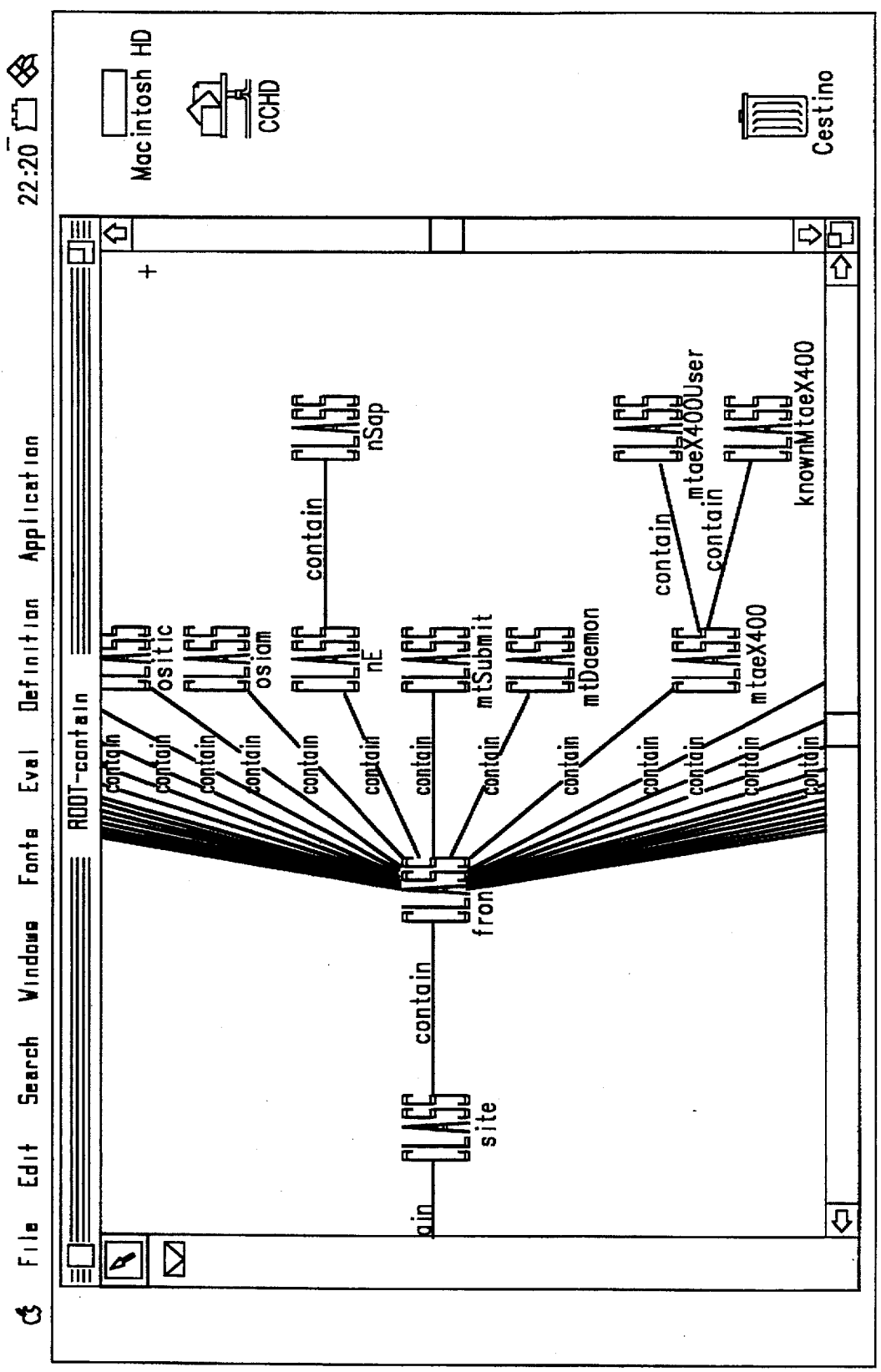
FIGS. 7A–E are bitmap screen shots illustrating operation of the Network Object Editor of FIG. 5.

Referring now to FIGS. 7A–E, operation of the Network Object Editor (NOE) 515 is illustrated. NOE 515 is a tool provided by the system for defining the Network Configuration Model 525. More particularly, it provides the set of objects, rules, and constraints which define a network configuration. In a preferred embodiment, NOE modelling is OSI compliant; thus, object classes will preferably be arranged in hierarchies. A containment hierarchy, for example, specifies the structure of the MIB. As shown in FIG. 7A, a model has been loaded, with its containment tree graphically illustrated in the window. As before, the user may perform operations upon any icon, including inspecting, browsing, and changing.

Figure 7B:
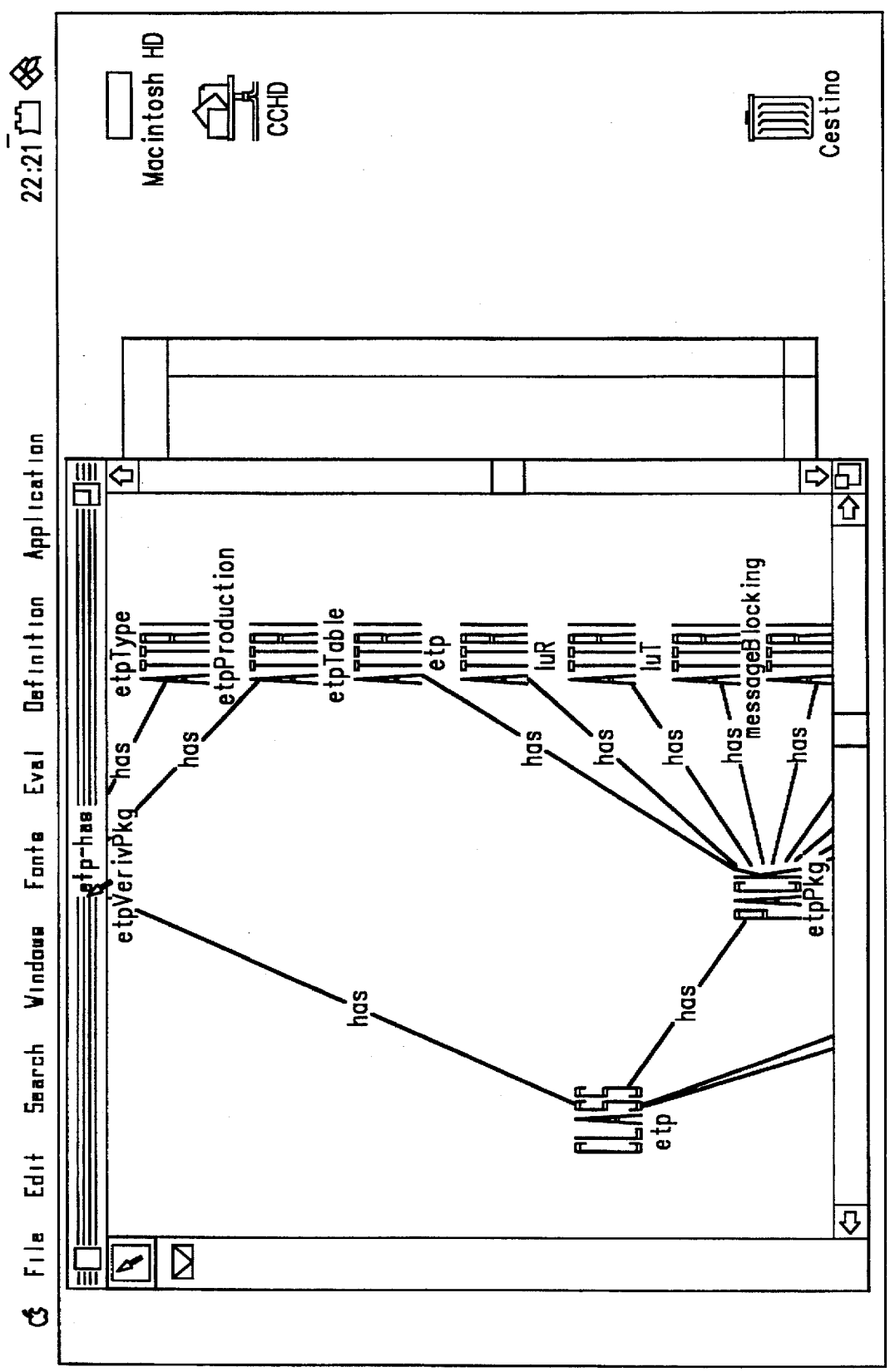
Figure 7C:
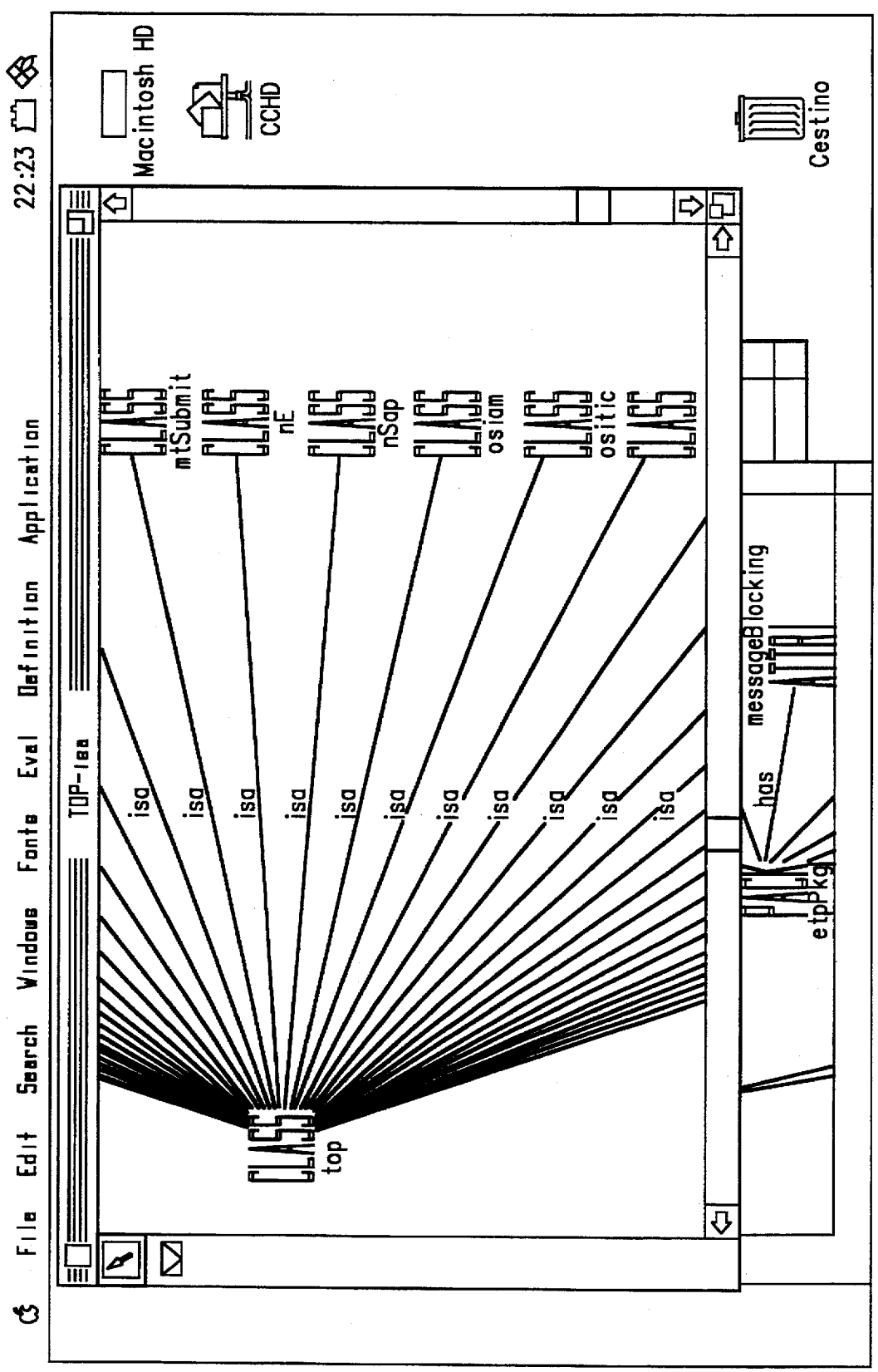
Figure 7D:
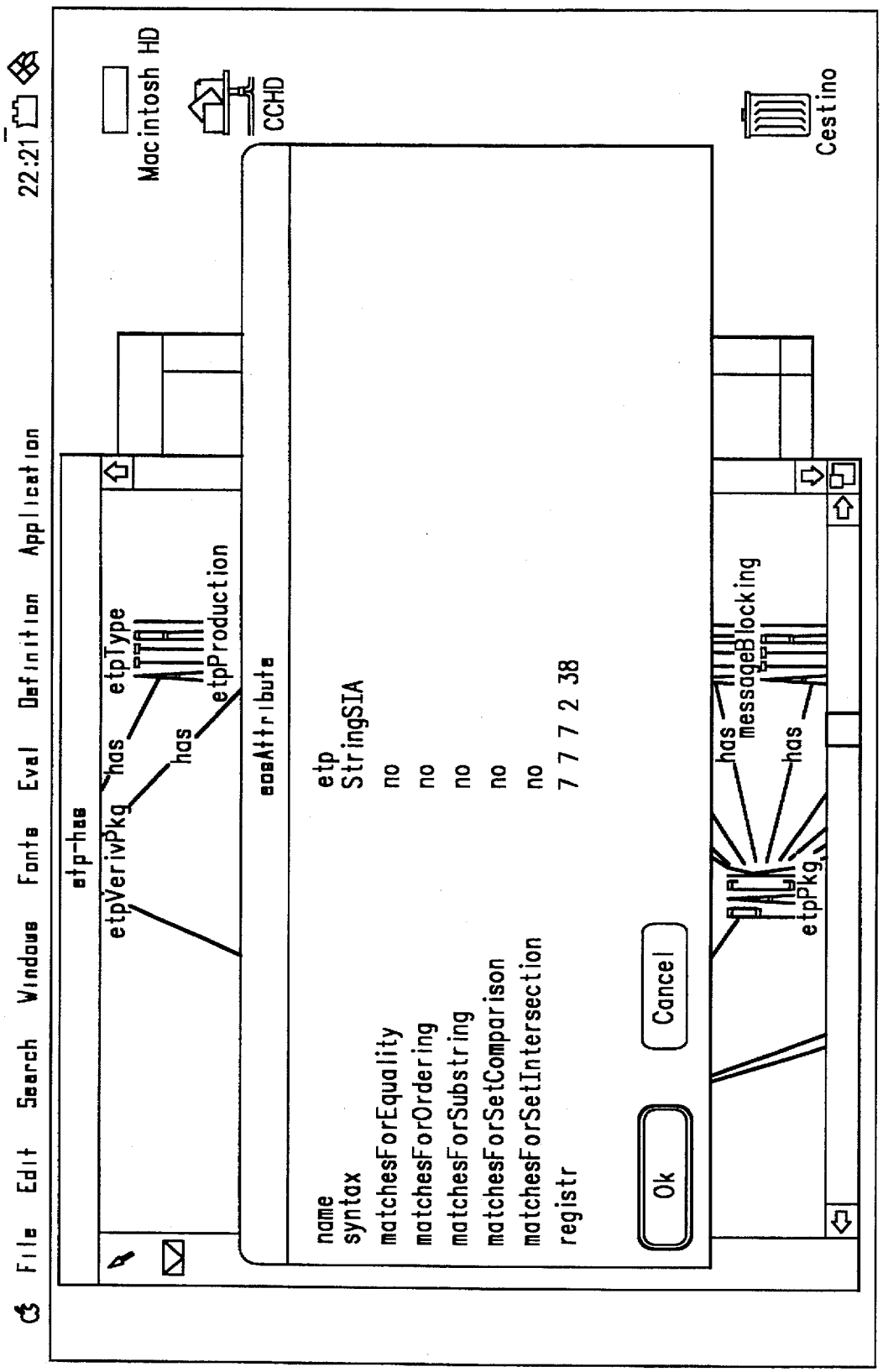
Figure 7E:
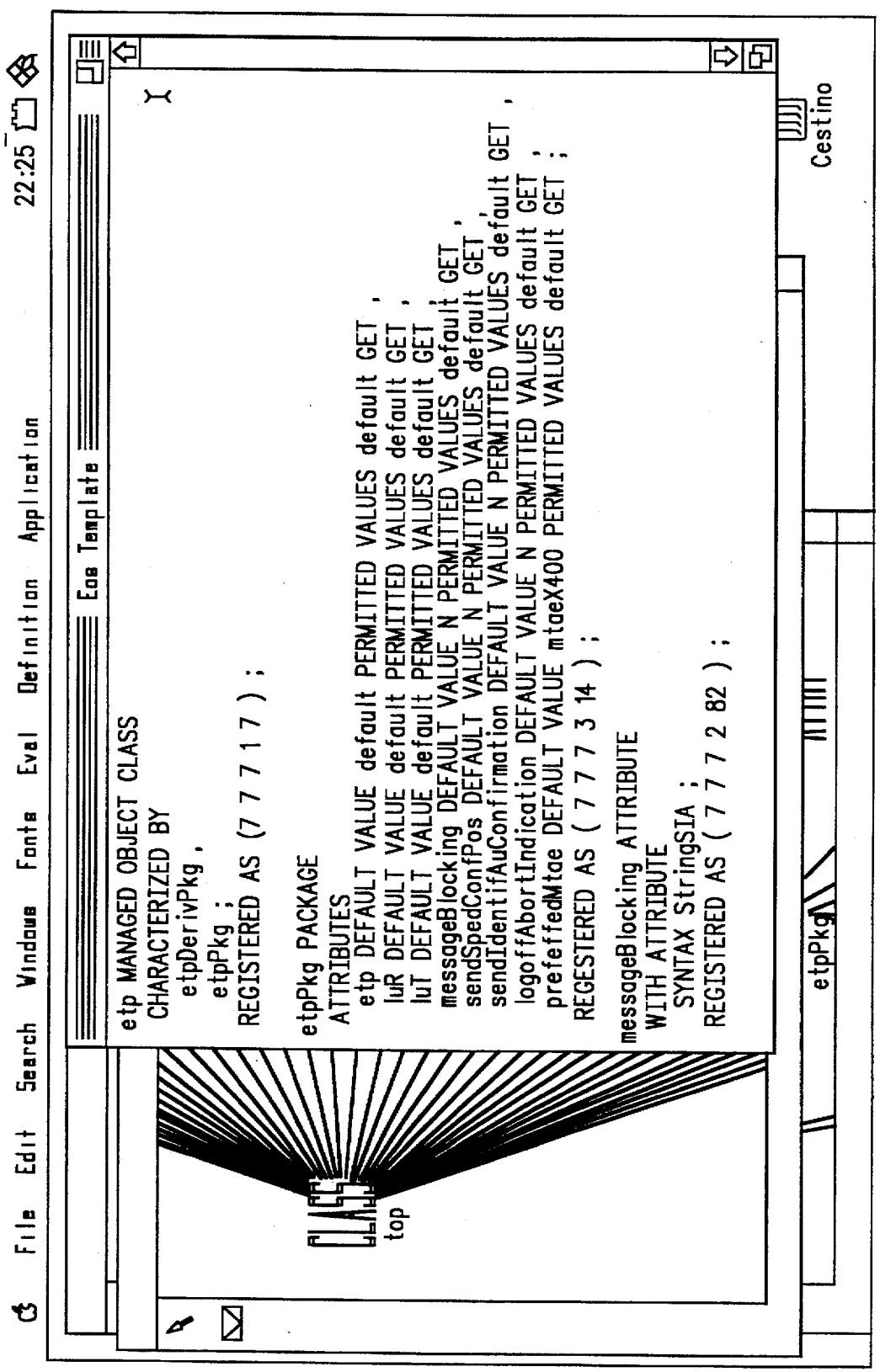

As shown in FIG. 7B, every object class is, in turn, described by its containment and subclass relationships with other classes and by its relationships with "packages," i.e., sets of attributes and behavior definitions. In the example shown, the general structure of an "ETP" object class is illustrated. Subclass hierarchies, in turn, may be inspected, as shown in FIG. 7C. Finally, information about particular attributes may be examined, as illustrated in FIG. 7D. If desired, NMF and HP-Open view templates may be produced from the database of NOE 515.

IV. Alternative Embodiment: Company Management

The Network Object Editor of the present invention includes a toolkit which allows the object editor to function in a generic fashion. Specifically, while the NOE has been described for use in a networking environment, it may accommodate many different domains. Since the toolkit includes both the abductive agent 523 and user interface 510, one may create and immediately test various domain definitions.

Application of the toolkit to a different environment (domain) will now be described. A domain may be defined for a hypothetical company, with departments and subdepartments, rooms, meetings, agendas, people, and the like. In this example, the problem is to handle properly an object base in a consistent manner, according to given organizational or company rules. To this end, a data dictionary is opened, and object classes are displayed, together with some important relationships existing between them (e.g., "contain" and "accept"). As shown, for example, a department contains an employee. An employee, in turn, may contain additional subclasses (e.g., agenda and activity). The department may also contain other classes, including room and meeting.

Figure 8A:
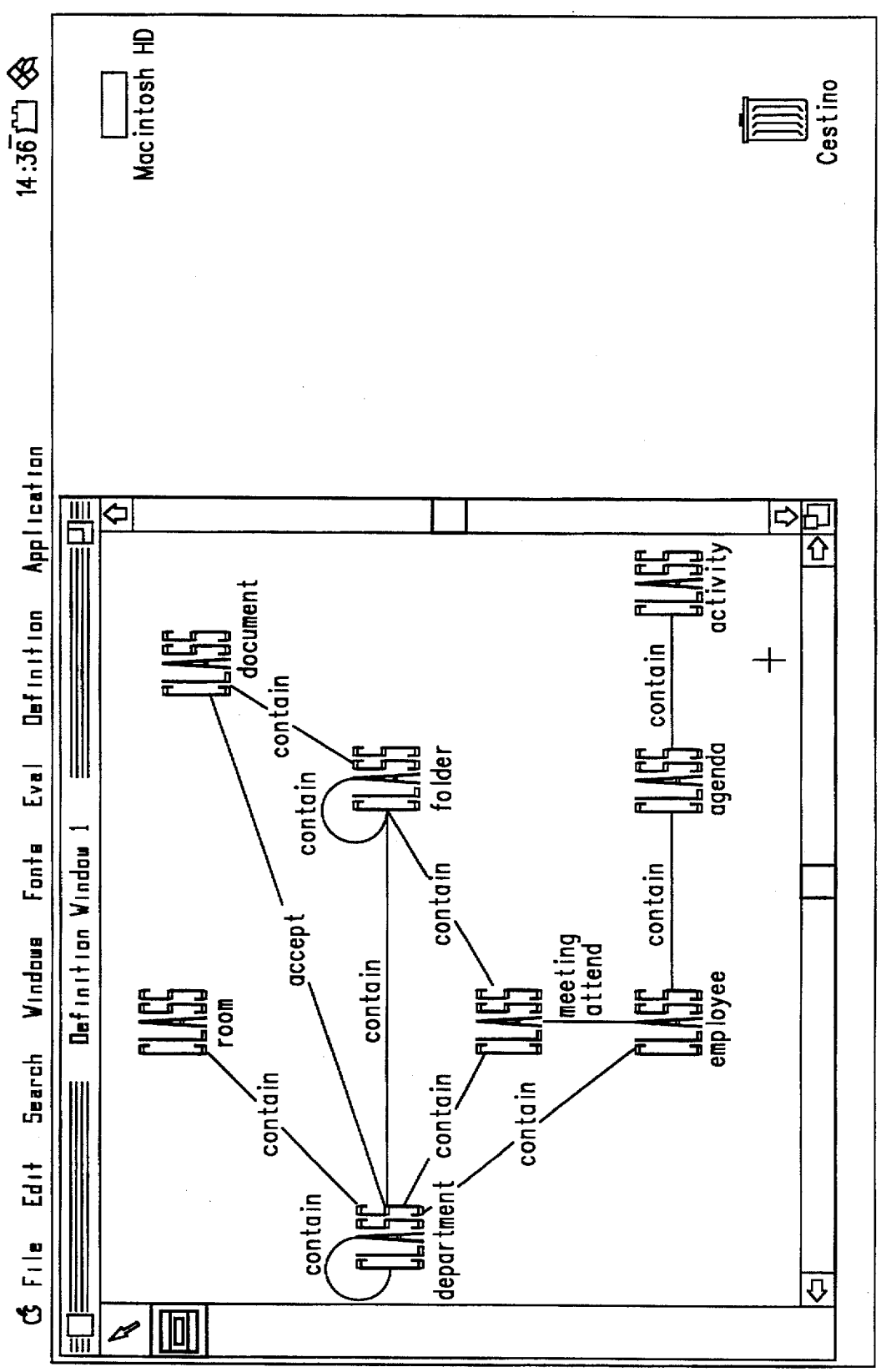
Figure 8B:
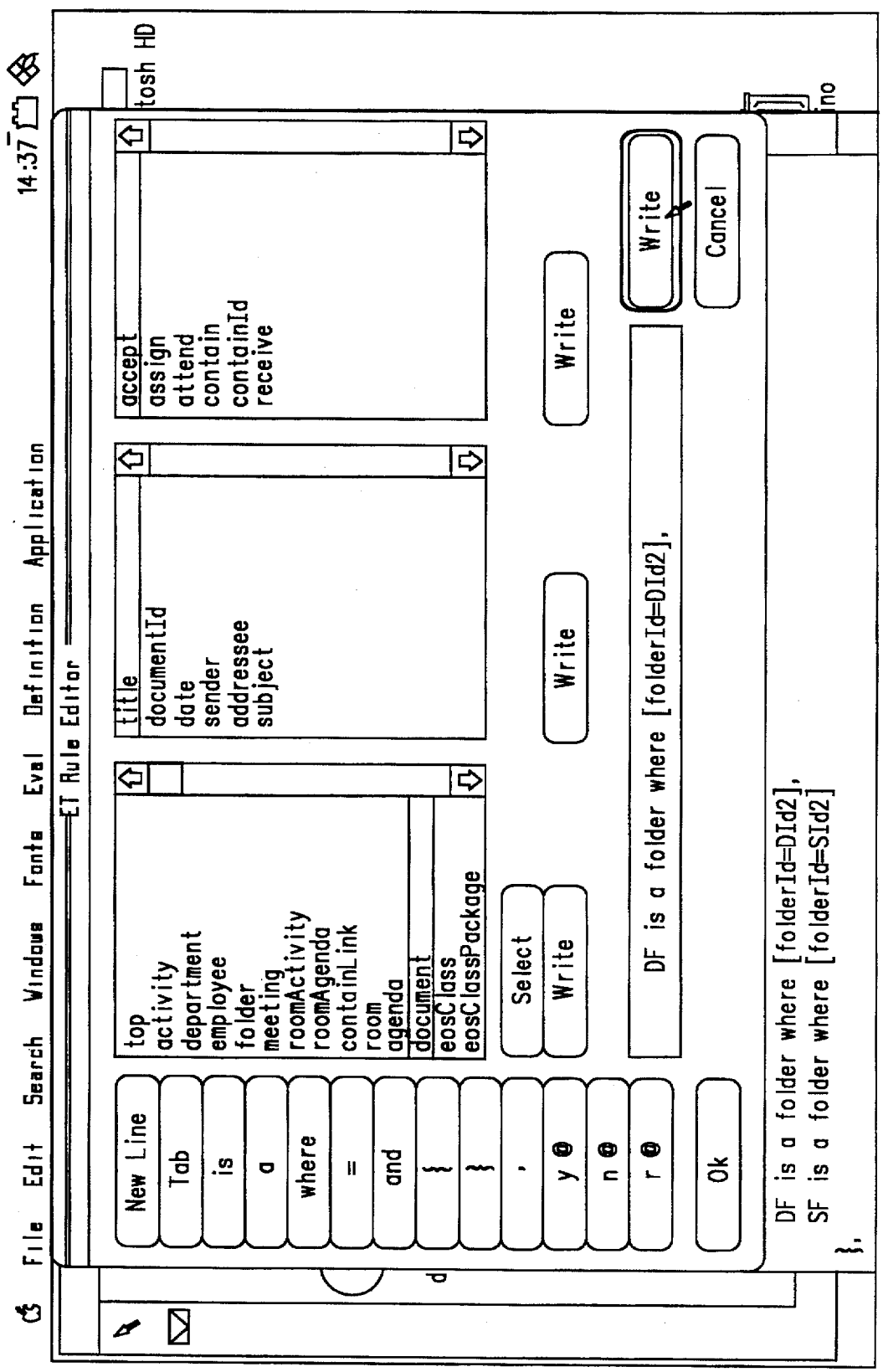
Figure 8C:
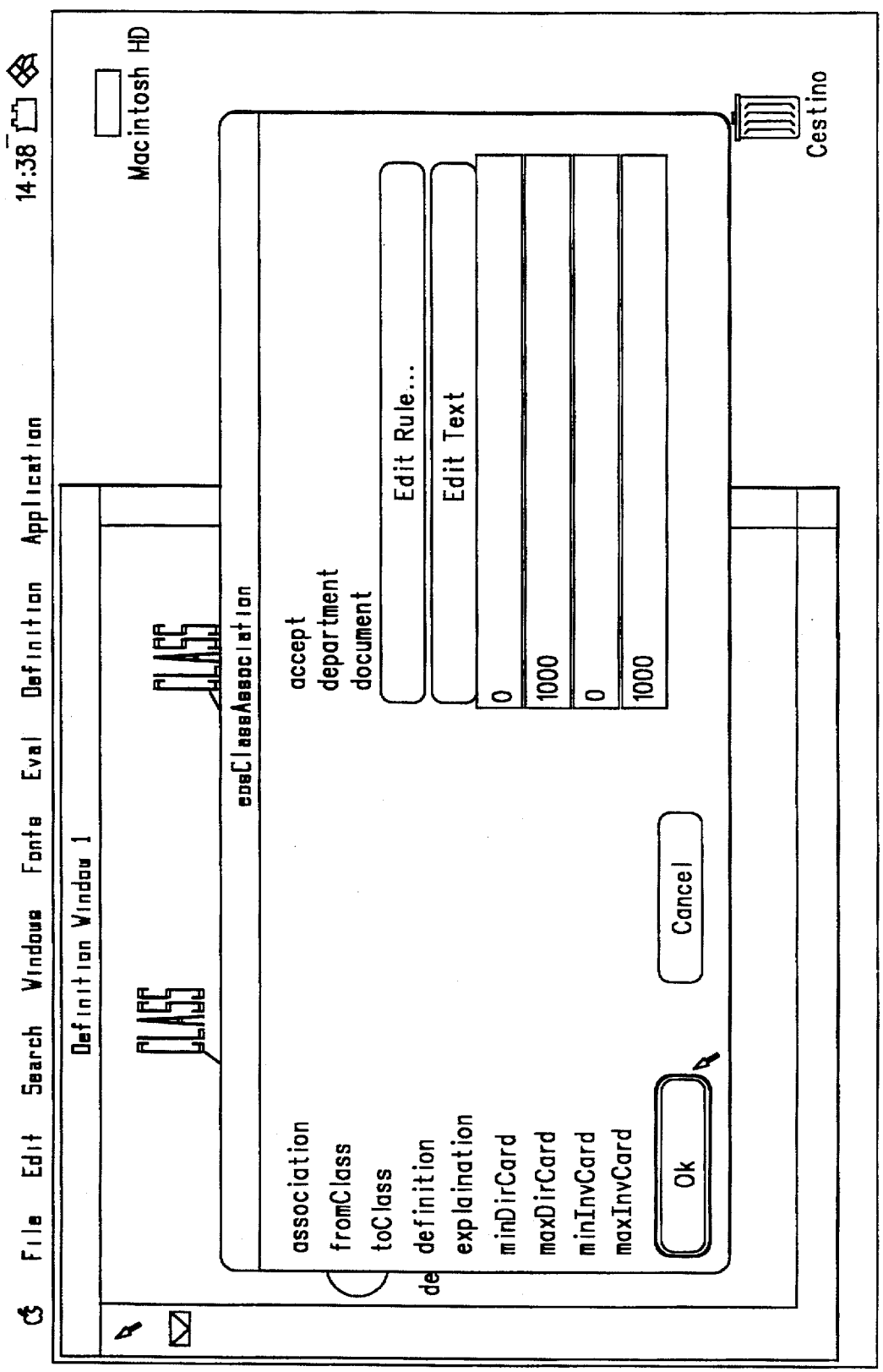

As shown in FIG. 8B, an editor dialog is provided for editing relationship definitions. The editor knows (i.e., includes information) about objects, including their structure, relationships, and rule syntax. As shown, for example, a document may include a title, document ID, date, sender, addressee, subject, and the like. In this manner, a data dictionary is defined for the domain of interest. As shown in FIG. 8C, the attributes of a relationship may be interactively examined. The relationship between department and document is shown, for example.

Figure 8D:
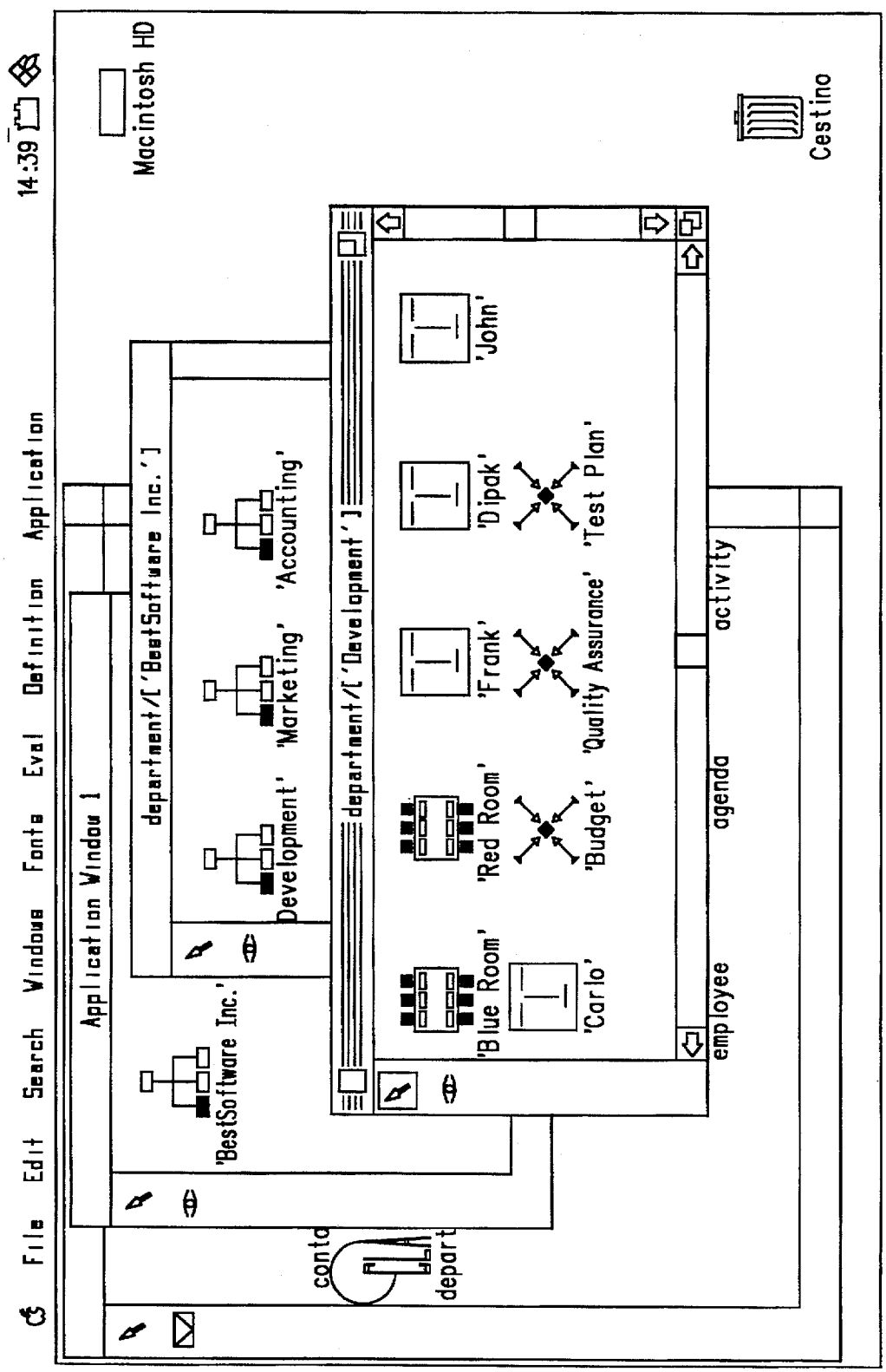
Figure 8E:
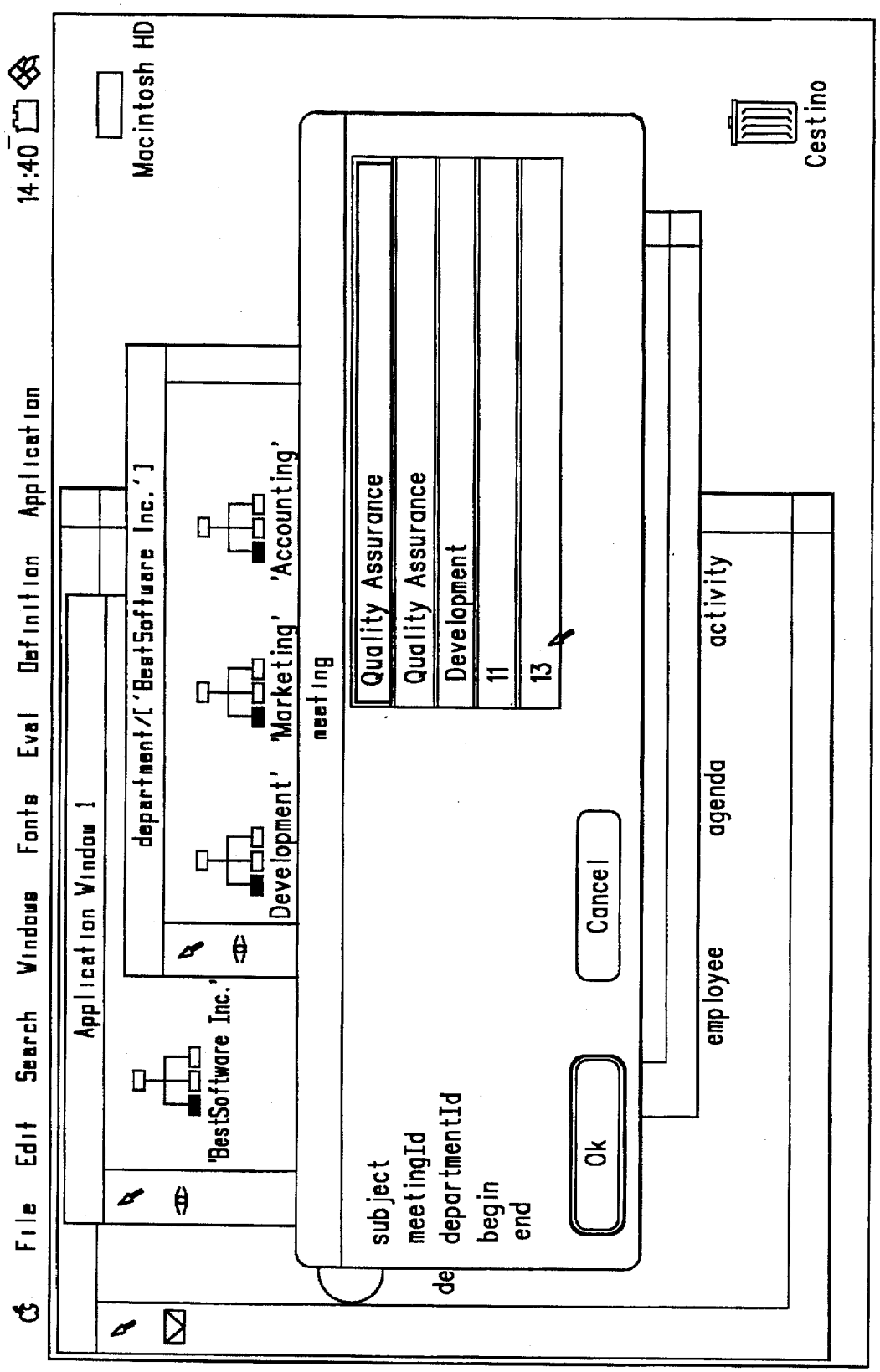

In FIG. 8D, an existing database is open which contains information about the hypothetical company. First, an application window is created containing the root: "Best Software, Inc.". As before, the root is expanded. For instance, the company is expanded to include the department "Development." As shown, the department includes rooms, people, and meetings. As before, attributes may be inspected. As shown in FIG. 8E, for example, the attributes of a meeting (in this case, "quality assurance") is examined.

Figure 8F:
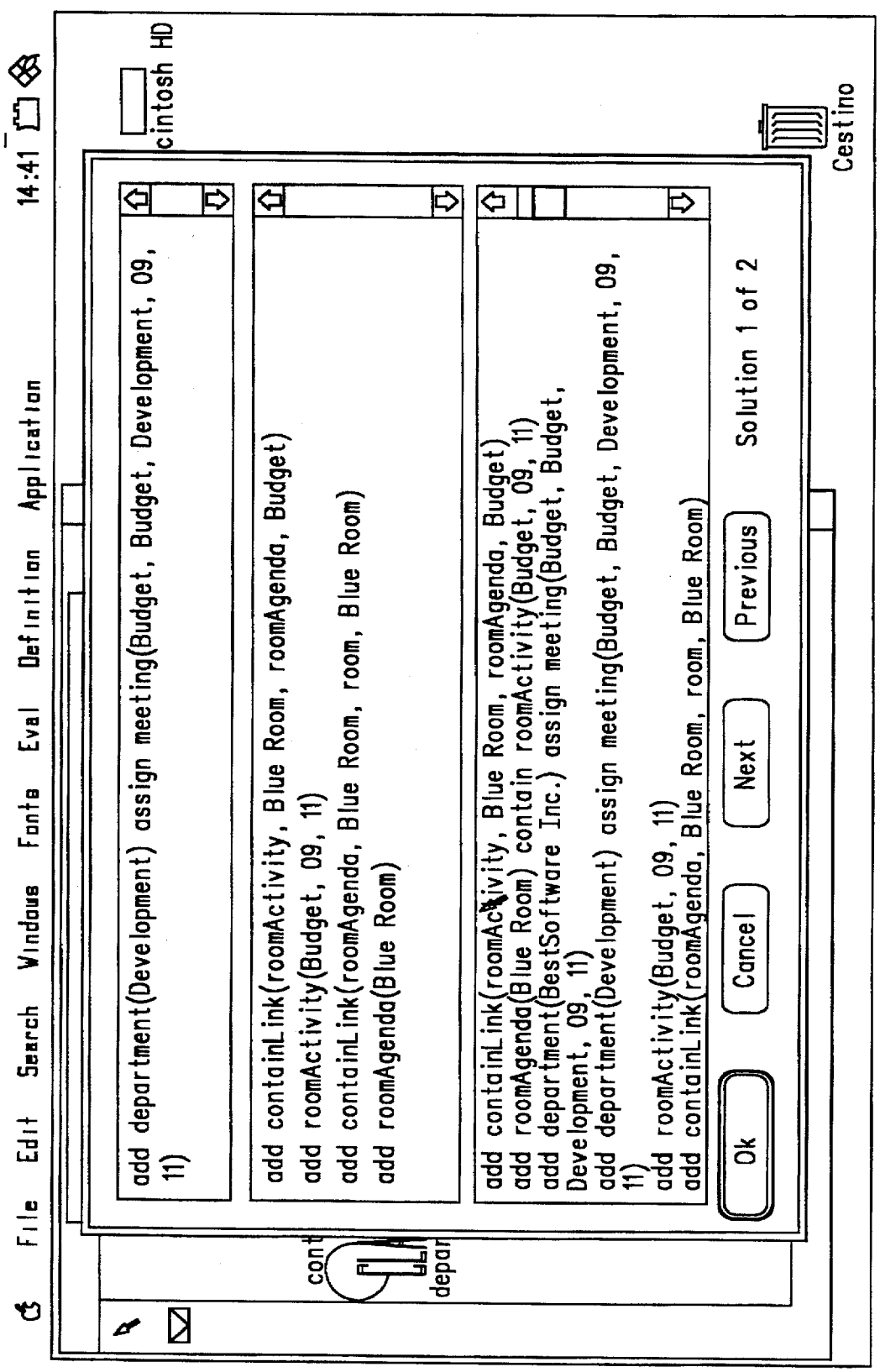
Figure 86:
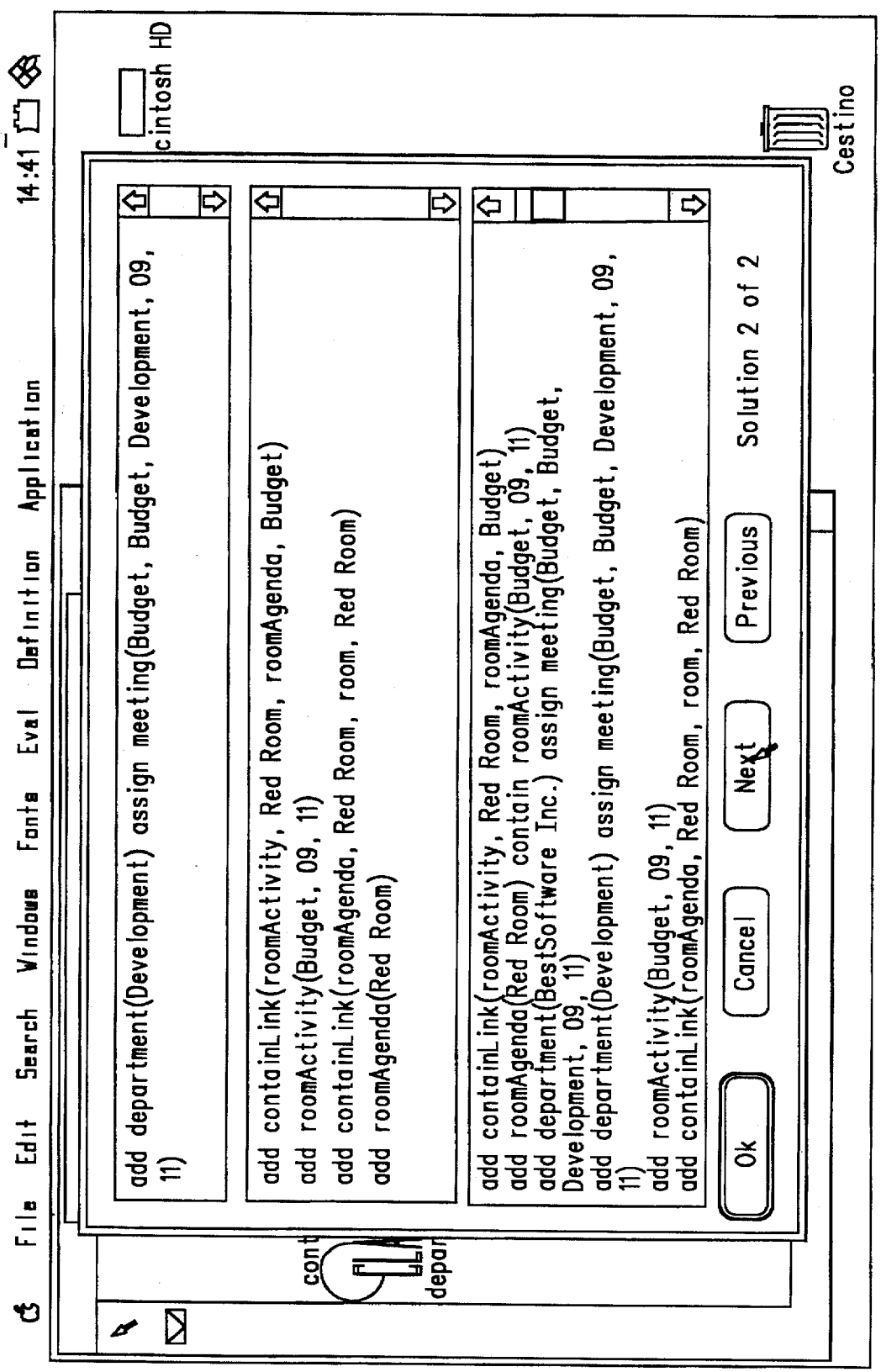

Having defined the domain, various tasks (requests) may now be performed. A common task in a company, for example, is the scheduling of meetings and assigning rooms. As shown in FIG. 8F, for example, the system is asked to let the department "Development" assign (i.e., schedule) a "Budget" meeting. In response, the system shows two possible solutions, each using one of the two available rooms. Continuing the user interface format previously described, the upper part of the dialog contains the user's request. The middle part of the dialog contains the updates that the system is proposing to meet this request. Finally, the lower part of the dialog contains consequences of applying the update. In FIG. 8G, the alternative or second solution is also shown.

Figure 8H:
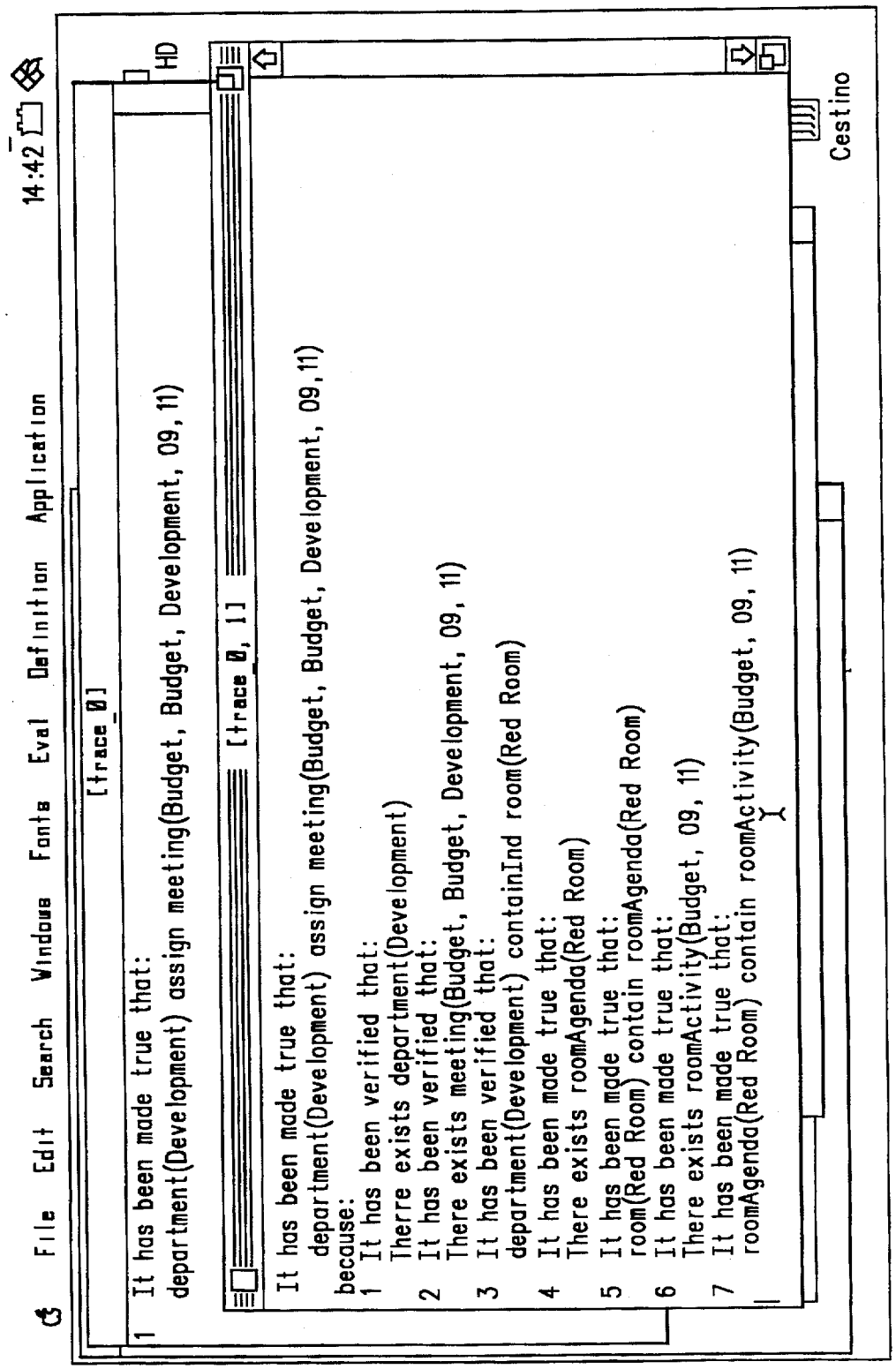
Figure 8I:
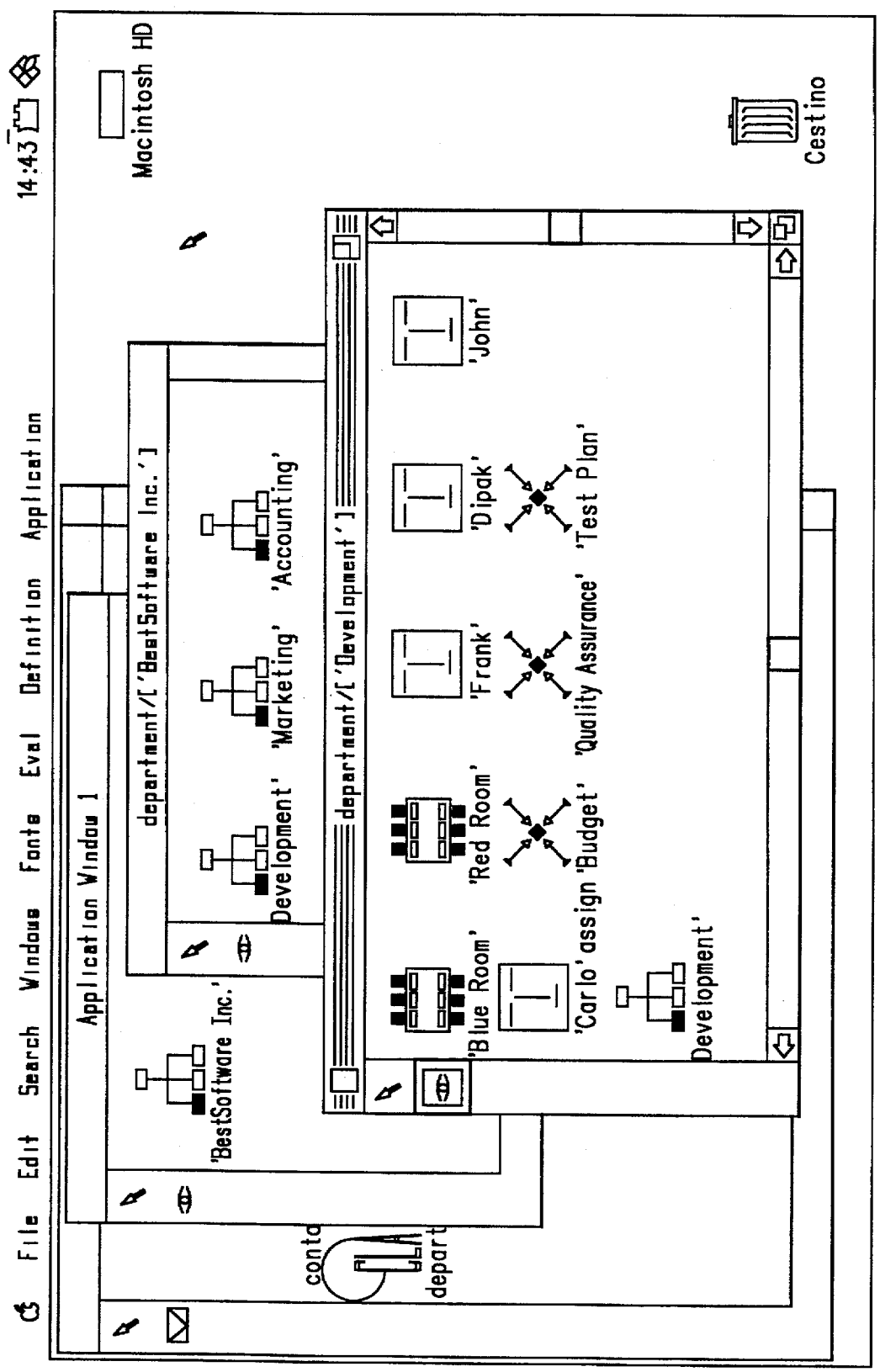

Continuing the example, the user has selected the second solution and now wishes an explanation. As shown in FIG. 8H, a text window is displayed which explains or traces the reasoning supporting the solution. As shown in FIG. 8I, the accomplished result may be portrayed in a graphic window. In this example, the "Development" meeting is "Assigned" to the "Budget" department.

While the invention is described in some detail with specific reference to a single preferred embodiment and certain alternatives, there is no intent to limit the invention to that particular embodiment or those specific alternatives. For example, while exemplary embodiments of the present invention embodied in network configuration and company management domains have been described, the system of the present invention may be advantageously implemented in other domains (environments) as well. Therefore, the true scope of the invention is defined not by the foregoing description but by the following claims.

What is claimed is:

1. In a computer system, a method for automatically maintaining a domain of objects, the method comprising:
   (a) defining the domain by storing known information of the objects in a knowledgebase;
   (b) specifying constraints which the domain must obey;
   (c) receiving a request from a user for altering the domain;
   (d) from the known information, deducing new information from the known information in response to the request from the user for altering the domain;
   (e) if the new information is not sufficient for satisfying the request from the user for altering the domain, abducing additional new information which, when combined with the new information would satisfy the request from the user for altering the domain;
   (f) verifying that the domain does not violate the constraints if the new information and the additional new information is stored in the knowledgebase; and
   (g) storing the new information and the additional new information in the knowledgebase, whereupon a new domain satisfying the request from the user for altering the domain is defined.

2. The method of claim 1, wherein the step of storing the new information and the additional new information includes inserting and deleting objects in the knowledgebase.

3. The method of claim 1, wherein the known information includes attributes of the objects and relationships between the objects.

4. The method of claim 3, wherein the step of storing the new information and the additional new information includes inserting and deleting relationships between objects in the knowledgebase.

5. The method of claim 3, wherein the relationships between the objects includes a "contain" relationship, in which one object serves as a container for at least one other object.

6. The method of claim 3, wherein the relationships between the objects includes a "know" relationship, wherein one object knows how to communicate with at least one other object.

7. The method of claim 1 further comprising, before step (g):
   (h) repeating steps (d)–(f) a plurality of times, whereupon a plurality of new information and a plurality of additional new information is generated; and
   (i) displaying the plurality of new information and the plurality of additional new information to the user.

8. The method of claim 7, further comprising the step:
   (i) selecting one of the plurality of new information and one of the plurality of additional new information, whereupon only the one new information and the one additional new information is stored in the knowledgebase in step (g).

9. The method of claim 1 further comprising, before step (g):
   explaining to the user how the new information and the additional new information was obtained.

10. The method of claim 1 further comprising, after step (f):
    if storing the new information and the additional new information in the knowledgebase would cause the domain to violate the constraints, rejecting the new information and the additional new information.

11. The method of claim 1, further comprising the step:
    defining a new domain by repeating step (a) by storing known information of a new group of objects in the knowledgebase.

12. The method of claim 11, further comprising the step:
    repeating steps (b)–(g) with a new request from the user for altering the domain, whereupon the new domain of objects satisfies the new request from the user for altering the domain.

13. The method of claim 1, wherein the objects include data structures stored in a memory device for modeling observable environments.

14. In a system having a database means, the improvement comprising:
    (a) means for storing known facts in the database means for defining a state of the system;
    (b) means for storing constraints which maintain the system in a desired configuration;
    (b) requesting means for allowing the user to entering a request for a new state of the system; and
    (c) means for abducing new facts from the known facts until the new state of the system is satisfied without violating the constraints.

15. The system of claim 14, wherein the known facts includes information known about objects in the system, attributes of the objects in the system, and relationships between objects in the system.

16. The system of claim 14, wherein the constraints include generic logical formulas which specify conditions under which the system is considered consistent.

17. The system of claim 14, wherein the requesting means includes a User Interface for entering the request from the user for the new state of the system.

18. The system of claim 17, wherein the User Interface is a Graphical User Interface (GUI) for displaying the known facts as objects on a display means.

19. The system of claim 18, wherein the GUI displays objects in the system as icons and relationships between objects in the system as arcs.

20. The system of claim 19, wherein the request from the user for the new state in the system is entered by graphically manipulating selected ones of the icons and arcs.

21. In a communication network having a plurality of nodes, a system for maintaining a proper configuration of the communication network, the system comprising:

(a) means for storing information known about the nodes as base facts;

(b) means for storing constraints which define the proper configuration of the communication network;

(c) means for requesting a change in selected nodes;

(d) means for deducing deduced facts from the base facts;

(e) means for abducing abduced facts which, when applied to the deduced facts, satisfy the change in selected nodes; and (f) means for verifying that the constraints are not violated if the deduced facts and the abduced facts are accepted for satisfying a the change in selected nodes.

22. The system of claim 21, wherein the base facts include information about attributes and relationships of the nodes.

23. The system of claim 21, further comprising:

means for reconfiguring the communication network by storing new constraints.

24. The system of claim 21, wherein the change in selected nodes includes adding and deleting the selected nodes from the communication network.

25. The system of claim 21, wherein the change in selected nodes includes specifying that a node may communicate with selected other nodes.

26. The system of claim 21, wherein the requesting means includes a User Interface (UI) for displaying screen representations of the nodes and relationships between the nodes, wherein the change in selected nodes is requested by manipulating the screen representations.

27. The system of claim 21, wherein the verifying means rejects the abduced facts as false if the constraints would be violated.

28. The system of claim 21, wherein the constraints specify a communication protocol permissible between two of the nodes.

29. The system of claim 21, wherein the constraints specify a permissible communication network topology.

* * * * *